United States Patent [19]
Yoshimizu et al.

[11] Patent Number: 5,126,866
[45] Date of Patent: Jun. 30, 1992

[54] LIQUID CRYSTAL DISPLAY WITH A PLURALITY OF PHASE DIFFERENCE PLATES THE SLOW AXES OF WHICH FORM AN ANGLE OF 20 TO 40 DEGREES

[75] Inventors: Toshiyuki Yoshimizu, Kyoto; Hiroshi Ohnishi, Nara; Kyouhei Isohata; Yumi Yoshimura, both of Yamatokooriyama, all of Japan

[73] Assignee: Sharp Kabushiki Kaisha, Osaka, Japan

[21] Appl. No.: 564,769

[22] Filed: Aug. 9, 1990

[30] Foreign Application Priority Data

| Aug. 11, 1989 | [JP] | Japan | 1-209384 |
| Jan. 17, 1990 | [JP] | Japan | 2-9200 |
| Jan. 19, 1990 | [JP] | Japan | 2-11156 |
| Feb. 5, 1990 | [JP] | Japan | 2-25665 |
| Mar. 19, 1990 | [JP] | Japan | 2-71495 |

[51] Int. Cl.$^5$ ............................................. G02F 1/1335
[52] U.S. Cl. ............................................. 359/63; 359/73
[58] Field of Search ............... 350/347 R, 339 R, 337; 359/63, 73, 74

[56] References Cited

U.S. PATENT DOCUMENTS

| 4,844,569 | 7/1989 | Wada et al. | 350/347 R |
| 4,852,976 | 8/1989 | Suzuki | 350/347 R |
| 4,889,412 | 12/1989 | Clerc et al. | 350/347 R |
| 4,973,137 | 11/1990 | Kozaki | 350/347 R |
| 4,984,874 | 1/1991 | Yamamoto et al. | 350/347 R |

FOREIGN PATENT DOCUMENTS

| 0246842 | 11/1987 | European Pat. Off. |
| 0311339 | 12/1989 | European Pat. Off. |
| 0372973 | 6/1990 | European Pat. Off. |
| 64-519 | 9/1988 | Japan |
| 63-271415 | 11/1988 | Japan |
| 64-18122 | 1/1989 | Japan |

Primary Examiner—Stanley D. Miller
Assistant Examiner—Anita Pellman Gross

[57] ABSTRACT

In a supertwist type liquid crystal display device using a supertwist type liquid crystal display cell and an optical compensation plate made of phase difference plates of uniaxial oriented polymer film, the phase difference plates include more than two phase difference plates laminated and disposed on one side or both sides of the liquid crystal display cell with various suitable disposition conditions, so that the whiteness level of the display can be improved. In one example, they are placed so that the retardation value of each of the phase difference plates is added and a cross angle between the slow axis of the first phase difference plate and the slow axis of the nth phase difference plate is 20° to 40°, and a further cross angle between the slow axis of the first phase difference plate and the rubbing axis of the substrate adjacent to the liquid crystal display cell is in a range from 70° to 90°.

12 Claims, 33 Drawing Sheets oriented direction

Elevation Angle ($\psi$)

LIQUID CRYSTAL DISPLAY WITH A PLURALITY OF PHASE DIFFERENCE PLATES THE SLOW AXES OF WHICH FORM AN ANGLE OF 20 TO 40 DEGREES

BACKGROUND OF THE INVENTION

1. Field of the Invention

This invention relates to supertwist type liquid crystal displays with phase difference plates.

2. Description of the Prior Art

In general, supertwist type (or abbreviated to 'STN') liquid crystal displays intrinsically show yellow green or blue color due to the birefrengence of their liquid crystal layers, which can be converted to bright and clear black-and-white displays through color correction using an optical compensator. By this color correction, the display quality is upgraded to the level which enables liquid crystal displays to be utilized for OA equipment such as word processors, computers and the like.

As supertwist type liquid crystal displays with color correction, those of a double-layered type are available, in which a coloring made in the first layer acting as a driving liquid crystal cell is color corrected to provide the displays achromatic in the second layer acting as an optical compensating cell. This structure provides clear black-and-white displays which make a significantly upgraded visibility in comparison with a single-layered crystal supertwist type liquid crystal display. However, since two liquid crystal cells are required, this display has problems of being thick in depth and having an increased weight.

To solve these problems, there has been developed a thin and light supertwist type liquid crystal display by utilizing a phase difference plate as an optical compensator which is composed of a uniaxial oriented polymer film made from polycarbonate, polyvinyl alcohol and the like. However, since this phase difference plate is fabricated by extending a polymer film, there arises a difference in optical nature of the film between the direction along which it is extended and the direction perpendicular to the extension. This then will compose another problem that phase difference plate supertwist type liquid crystal displays have greater color changes depending upon viewing angles or elevation angles. That is, they have narrower viewing angles in comparison with double-layered supertwist type liquid crystal displays.

The phase difference plate composed of a uniaxial oriented film makes an optical compensator utilizing its anisotropy. In this arrangement, there is a difference in refractive index (birefrengence) of the film between the direction along which it is extended and the direction perpendicular to the extension. Retardation ($\Delta n \cdot d$) given by the product of this refractive index ($\Delta n$) and the thickness of the film (d) is a physical quantity defining the phase of light determined when it passes through the film, and differs in the direction along which the film is extended and the direction perpendicular to the extension. For example, in a phase difference plate made from polycarbonate and the like which represents a uniaxial crystal, the retardation increases in the extended direction and decreases in the direction perpendicular to the extension. When combined with a liquid crystal display cell, especially in the direction of the phase difference plate extension, an increased difference arisen between the retardation of the phase difference plate and that of the liquid crystal display cell will cause light passing through the assembly to have a phase difference to result in a colored display. That is, no color compensation is performed and hence narrower viewing angles will result because of lowered contrast of the display.

In addition, for those liquid crystal displays which are used for OA equipment, such as personal computers provided with a mouse or handwriting function requiring fast response, a liquid crystal material with the sum of rise time and decay time 100 ms or less will have its sharpness ($\alpha$ value) of 1.10 or more and accordingly, an insufficient contrast will result.

FIG. 5 is a figure showing the relationship between the sharpness ($\alpha$ value) and the response time (ms) of a liquid crystal material. In general, as illustrated, the more the response time increases, the less the sharpness ($\alpha$ value) becomes, and the contrast falls accordingly. Therefore, the utilization of liquid crystal displays for high speed response in high duty applications was impossible and heretofore they have been used in low duty applications.

SUMMARY OF THE INVENTION

It is, accordingly, an object of the present invention to overcome the aforementioned problems by providing a liquid crystal display which is thin and light in construction and capable of obtaining clear black-and-white displays together with a wide angle of visibility.

Another object is to provide a liquid crystal display which gives a good contrast when combined with a liquid crystal cell of high speed response.

This invention is characterized in that a plurality of phase difference plates are piled on each other in such a way that their retardations are added, and the cross angle between the slow axis of a phase difference plate at the first layer and the slow axis of a phase difference plate at the nth layer is 20° or more and that the slow axes of phase difference plates at the second layer through the (n-1)th layer fall within said cross angle. And further, the cross angle between the slow axis of a phase difference plate adjacent to the liquid crystal display cell and the rubbing axis of a substrate adjacent to the liquid crystal display cell is set to fall within the range between 70° and 90°. In addition, phase difference plates provided are disposed in the front and back of the liquid crystal display cell in such a way that they are placed symmetrically with respect to the liquid crystal display cell.

The construction thus arranged will provide the following effects hereinafter described. The reason why a uniaxial oriented polymer film is utilized as a phase difference plate is that the film has an optical anisotropy. That is, the relative phase difference of the light (ordinary and extraordinary light) passing through the liquid crystal panel is cancelled or equalized in phase by the phase difference plate and the resultant light is achromatized.

This color compensation utilizes the property of the high polymer film in which there is a difference in refractive index thereof between the direction along which it is extended and the direction perpendicular to the extension. Meanwhile three-dimensional refractive indexes should be taken into consideration when the viewing angle characteristic of a phase difference plate is to be reviewed. By assuming the three-dimensional refractive indexes of a phase difference plate to be $\Delta nMD$ (extended direction), $\Delta nTD$ (direction perpendicular to the extended direction), and ΔnZD (direction of the thickness) respectively, the refractive index and retardation seen from the extended direction and those seen from the direction perpendicular to the extended direction can be given by the following equations where the elevation angle of the phase difference plate from the normal line direction is (1) When seen from the extended direction refractive index $$\Delta nMD = \sqrt{\{nMD^2 nZD^2/(nMD^2\sin^2\phi + nZD^2\cos^2\phi)\}} - nTD$$

phase difference $RMD = \Delta nMD \cdot d/\cos\phi$ (2) When seen from the direction perpendicular to the extended direction refractive index $$\Delta nTD = nMD - \sqrt{\{nTD^2 nZD^2/(nTD^2\sin^2\phi + nZD^2\cos^2\phi)\}}$$

phase difference $RTD = \Delta nTD \cdot d/\cos\phi$

Measuring the refractive indexes in three dimensions respectively and substituting them into the above equations will give the results shown in FIG. 1, which indicates the relationship between the elevation angle and the retardation of a phase difference plate obtained through the theoretical equations. From the results it is found that the retardation tends to decrease in the extended direction of the film and to increase in the direction perpendicular to the extended direction (in the case of uniaxial positive crystal). FIG. 2 shows the measured results of the retardation depending on viewing angles obtained through the Senarmont method for a phase difference plate made from polycarbonate. The retardation seen directly from overhead is in this case normalized to 1 in value. Starting from a bearing of 0° corresponding to the extended direction of the phase difference plate, measurements are performed at every 15° to a bearing of 90° which coincides with the direction perpendicular to the extended direction. The readings thus taken agree with the tendency of retardation obtained from the above mentioned theoretical equations. FIG. 3 shows a variation of retardations with respect to the change in elevation angles of a phase difference plate determined from FIG. 2 whereas FIG. 4 indicates a variation of retardations with respect to the change in elevation angles of a liquid crystal display cell. When a phase difference plate and a liquid crystal display cell having such properties are combined, there arises a large difference between the liquid crystal display cell and the phase difference plate in retardation in the extended direction of the phase difference plate. Accordingly, the light (ordinary and extraordinary light) passing through the assembly thus combined will have the resultant phase difference and take on color. The contrast of displays will then fall to result in a narrow viewing angle. Therefore, to widen a viewing angle, it is effective to provide an optical compensator which has little retardation variation by way of piling up a number of phase difference plates.

When it comes to bring this idea into realization, however, the vibration plane of ordinary and extraordinary light should be taken into consideration for both a phase difference plate and a liquid crystal display cell. The vibration plane of ordinary beams is called the fast axis and the vibration plane of extraordinary light is called the slow axis, and when two phase difference bodies are overlapped to each other, the overlapping in which their fast axes (or slow axes) are superimposed in parallel is referred to as phase adding and the overlapping in which their fast axes (slow axes) are superimposed at right angles is referred to as phase subtracting. We have found after a variety of trials that phase difference plates piled up in the phase adding way show less retardation variation and accordingly, a wider viewing angle will be obtained. It has also been found that when phase difference plates are piled up in n layers by the phase adding, the cross angle between the slow axis of a phase difference plate at the first layer and that of the nth layer should be 20° or more to effectively widen the viewing angle. When performing the piling-up, the color compensation should be considered. To do this, phase difference plates at the second layer through the (n−1)th layer should be placed within the cross angle between the above-mentioned slow axis of a phase difference plate at the first layer and that of the nth layer. Since those phase difference plates adjoining to the liquid crystal display cell should be disposed by the phase subtracting way to effect color compensation, it was determined to place the slow axis of the phase difference plate adjacent to the liquid crystal display cell 70° to 90° away from the rubbing axis of the substrate adjacent to the liquid crystal display cell to obtain the optimum color compensation.

The piling-up disposition method, which has been heretofore described, will result in the same effect when phase difference plates are disposed in the front and rear of the liquid crystal display cell. In this case, those phase difference plates disposed in the front and rear of the liquid crystal display cell should be placed symmetrically with respect to the liquid crystal display cell to provide a liquid crystal display with a wide viewing angle.

The present invention is also characterized in that two phase difference plates are piled up at least on one face of the liquid crystal display cell in such a way that their retardations are added, and the cross angle between the slow axis of a phase difference plate at the first layer and the slow axis of a phase difference plate at the second layer is 20° or more and that the slow axis of a phase difference plate at the second layer is placed in the direction where the elevation angle dependency of the retardation of a phase difference plate at the first layer becomes minimum. The present invention is further characterized in that the cross angle between the slow axis of a phase difference plate adjacent to the liquid crystal display cell and the rubbing axis of a substrate adjacent to the liquid crystal display cell is set between 70° and 90° and that the piled up phase difference plates are disposed in the front and rear of, or either in the front or rear of the liquid crystal display cell, or the piled up phase difference plates are disposed on one face of the liquid crystal display cell and a single-layer phase difference plate on the other.

The construction thus arranged will provide the following effects hereinafter described. It is seen in FIG. 3 that when the elevation angle is increased as 15°, 30°, 45°, and 60°, the variation of retardation values decreases in the extended direction and increases in the direction perpendicular to the extended direction. This may be explained theoretically as previously described. However, as clearly seen from FIG. 3, there is a bearing in which the variation of retardation values is very little (becomes smallest) in spite of an increase of the elevation angle (in FIG. 3, the direction in which the curves indicating the retardation variation intersect.)

After having an extensive investigation for a variety of phase difference plates made of uniaxial oriented high polymer films different in materials and manufacturing methods, we realized that for all phase difference plates concerned there is a bearing in which the variation of retardation values becomes smallest as shown in FIG. 3.

We then looked into the angle made between the extended direction and the bearing with the smallest variation of retardations in connection with manufacturing methods and materials. As to the manufacturing methods including the vertical uniaxial oriented process and the horizontal uniaxial oriented process, although there was a tendency that phase difference plates by the vertical uniaxial oriented process had a larger amount, there was not any significant difference between the two processes concerning this angle. As to the materials generally including polyvinyl alcohol (PVA) films and polycarbonate (PC) films, phase difference plates made of films indicated the larger angle. The angle ranged from 30° to 40° for PC films and 35° to 45° for PVA films.

On the other hand, as shown in FIG. 4, in the liquid crystal display cell the increase in retardation was found larger in the direction and the opposite direction of the viewing angle, and smaller in the left and right directions.

Utilizing the bearing to cause the smallest retardation variation not depending upon the elevation angle as shown above is effective to provide an optical compensator having a small retardation variation provided with a few layers of phase difference plates. We found that when phase difference plates were piled up phase addingly in n layers, the cross angle between the slow axis of a phase difference plate at the first layer and that of a phase difference plate at the nth layer should be 20° or more to effectively widen the viewing angle as mentioned above.

In particular, when two layers are piled up, it is effective to utilize the bearing in which the elevation angle dependency shown in FIG. 3 becomes smallest. We have found that in this case overlapping the phase difference plate at the second layer in parallel with the bearing in which the retardation variation of the phase difference plate at the first layer with respect to the elevation angle becomes smallest causes the retardation variation when combined with the liquid crystal display cell to reduce and the viewing angle to spread.

This overlapping means that the direction in which the retardation of these phase difference plates decreases aligns with the direction in which the retardation variation of these phase difference plates becomes smallest, for each other. As a result, in the piled-up phase difference plates, the decrease of retardation values in the extended direction is suppressed and the retardation variation is averaged. Further when they are combined with the liquid crystal display cell, the retardation difference in the extended direction of the phase difference plates becomes small, thereby widen the viewing angle.

When performing the piling-up, the color compensation should be taken into consideration. The phase difference plate adjoining the liquid crystal display cell should be disposed phase subtractingly with respect to the liquid crystal display cell, to effect the color compensation. In this case, we have found that the cross angle between the slow axis of a phase difference plate adjacent to the liquid crystal display cell and the rubbing axis of a substrate adjacent to the liquid crystal display cell of 70° to 90° will attain the optimum color compensation.

The piling-up disposition method which has been heretofore described will provide a liquid crystal display with a wide viewing angle and a high contrast in all the cases in which piled-up phase difference plates are disposed in the front and rear of the liquid crystal display cell, or they are disposed either in the front or the rear of the liquid crystal display cell, or piled-up phase difference plates are disposed on one face of the liquid crystal display cell and a single-layer phase difference plate is disposed on the other.

By disposing the phase difference plates as above-mentioned on a high-speed response liquid crystal display cell, a good contrast can be obtained through color correcting the light passing through the liquid crystal display cell, increasing the ON transmittance, lowering the OFF transmittance, and rising the ratio of ON/OFF transmission light quantities. Further, in comparison with the case where a conventional correcting liquid crystal cell is combined, the present structure attains a higher transmission light quantity to result in a thin and light liquid crystal display with bright and clear displays.

After having a number of considerations, we found that the following two arrangement structures are effective in order to widen the viewing angle in phase difference plate type STN liquid crystal displays.

The first arrangement has a structure in which two phase difference plates are piled up with their slow axes staggered with respect to each other, so that their retardations are phase addingly superimposed. The second arrangement has a structure in which a polymer film, having its maximum refractive index direction layed in its thickness direction is piled upon a phase difference plate.

Upon a precise consideration on the first arrangement structure, we have found that the largest viewing angle spreading effect is obtained when the two phase difference plates are piled up in such a way that the cross angle made between their slow axes ranges from 30° to 40°, and the cross angle between the slow axis of the phase difference plate adjacent to the liquid crystal display panel and the rubbing axis of the substrate adjacent to the liquid crystal display panel is 70° to 90°.

After the same procedure as in the case of the first arrangement structure, we have found on the second arrangement structure that the largest viewing angle spreading effect is obtained when the polymer film, having its maximum refractive index direction layed in its thickness direction is piled up on the phase difference plate in such a way that the cross angle made between the extended direction of the polymer film and slow axis of the phase difference plate is 45°, and when the cross angle between the slow axis of the phase difference plate adjacent to the liquid crystal display panel and the rubbing axis of the substrate adjacent to the liquid crystal display panel is 70° to 90°. Hereinafter this polymer film having its maximum refractive index direction layed in its thickness direction is referred to as a viewing angle compensator.

In the first arrangement structure, that is, a structure in which two phase difference plates are piled up, since the direction having the smallest retardation variation with respect to the elevation angle lies in a bearing 30° to 40° away from the extended direction of a phase difference plate as shown in FIG. 3, by placing the slow axis of one of the phase difference plates (in the case of a phase difference plate made of a polycarbonate film, the extended direction) on this bearing, the retardation variation with respect to the elevation angle can be made small. This is no other than that the two phase difference plates are piled up with their slow axes crossed at an angle of 30° to 40°.

On the other hand, as to the second arrangement structure, there is shown the results of the retardation variation with respect to the elevation angle of a viewing angle compensator obtained by calculation in FIG. 12. As illustrated, the retardation variation increases in the extended direction and decreases in the direction perpendicular to the extended direction in contrast to that of a phase difference plate. This feature may be utilized in installing phase difference plates in such a way that the retardation variation with respect to the elevation angle of the phase difference plates will be cancelled with respect to each other. In this case, because of the in-plane residual retardation of the viewing angle compensator due to the extension thereof, the extended direction of the compensator should be placed away from the slow axis of the phase difference plate by 45° to make the influence of the residual retardation minimum. This is no other than that a polymer film having its maximum refractive index lied in its thickness direction, that is, the viewing angle compensator is piled upon the phase difference plate with its extended direction crossing the slow axis of the phase difference plate at an angle of 45°.

Then, when these two types of viewing angle improving structures are applied to phase difference plate type STN liquid crystal displays, it is required to first determine which phase difference plate system should be taken as the bases. We simulated phase difference plate systems to seek one giving a higher ratio of contrast, finding that a two-phase difference plate system is preferable to a single plate one. Further, when using two phase difference plates in practice, at least one phase difference plate is preferably disposed in each of the front and rear of the STN liquid crystal display panel. For the construction in which the two viewing angle improving structures are combined with the foregoing basic phase difference plate system, the following five combinations can be proposed:

(1) The first arrangement structure is applied in either the front or the rear of the liquid crystal display panel, with the remaining face thereof having a single phase difference plate disposed;

(2) The second arrangement structure is applied in either the front or the rear of the liquid crystal display panel, with the remaining face thereof having a single phase difference plate disposed;

(3) The first arrangement structure is applied in both the front and the rear of the liquid crystal display panel;

(4) The second arrangement structure is applied in both the front and the rear of the liquid crystal display panel; and (5) The first arrangement structure is applied in either the front or the rear of the liquid crystal display panel, with the remaining face thereof having the second arrangement structure applied.

Since the first arrangement structure has a larger viewing angle spreading effect than the second, these five combination patterns, when compared with one another, result in an increasing order of viewing angle, (2)<(4)<(1)<(5)<(3). Further to this comparison, the arrangement structure (3) uses four phase difference plates, so that its transmittance in the on-state will be lowered to a level which causes the bright display, one of the features of phase difference plate STN liquid crystal displays, to be deteriorated. Accordingly, it is the arrangement structure (5) which gives a viewing angle spreading effect with the conventional features of a high contrast ratio and bright display unchanged. This is the construction of the present invention in which the first and second arrangement structures are incorporated in combination.

The present invention is further characterized in that the supertwist type liquid crystal display utilizing a phase difference plate as an optical compensator which is composed of a uniaxial oriented polymer film has, on at least one face of a liquid crystal display cell, two piled-up phase difference plates in which their retardations are added, wherein the two phase difference plates are piled up in such a way that the cross angle between the slow axis of a phase difference plate at the first layer and the slow axis of a phase difference plate at the second layer is 20° or more and the direction of the slow axis of the nth layer is parallel to the direction in which the retardation value of the phase difference plate at the first layer is the least dependent on the elevation angle. Further, the cross angle between the slow axis of a phase difference plate adjacent to the liquid crystal display cell and the rubbing axis of a substrate adjacent to the liquid crystal display cell is within the range between 70° and 90°, each phase difference plate being composed of a uniaxial oriented high polymer film made from polycarbonate.

The piled-up phase difference plates may be disposed on one face of the liquid crystal display cell or on both the front and the rear thereof.

Further, in the case of combination between piled-layer phase difference plates and a single-layer phase difference plate, the invention is characterized in that on one face of the liquid crystal display cell is disposed the piled-up phase difference plates and on the other face thereof is disposed the single-layer phase difference plate in which the cross angle between the slow axis of the phase difference plate adjacent to the liquid crystal display cell and the rubbing axis of the substrate adjacent to the liquid crystal display cell is within the range of 70° and 90°, the single-layer phase difference plate being composed of a uniaxial oriented polymer film made from polycarbonate.

Uniaxial oriented polymer films of polycarbonate (PC) and polyvinyl alcohol (PVA) are known as phase difference plates. Regarding these phase difference plates, the retardations thereof with respect to elevation angles were measured with the Senarmont method and the results are shown in FIG. 2 (polycarbonate) and FIG. 16 (polyvinyl alcohol). If the retardation variation with respect to the elevation angle is determined from FIGS. 2 and 16, the results are as shown in FIGS. 3 and 17.

On the other hand, FIG. 4 shows the results of determining the retardation variation with respect to the elevation angle on the liquid crystal display cell.

According to FIGS. 3 and 17, which indicate the elevation angle retardation variation with respect to the bearing to the extended direction concerning the phase difference plates of polycarbonate and polyvinyl alcohol, respectively, the polycarbonate phase difference plate (FIG. 3) shows only a slight retardation variation due to bearing at the elevation angles of 15° and 30°, whereas it shows a clear retardation variation at the elevation angle of 45° and 60°. At the elevation angle of 60°, in particular, the variation rate approximately doubles between the extended direction and the direction perpendicular to the extension. On the other hand, the polyvinyl alcohol phase difference plate (FIG. 17) shows a little variation due to bearing at the elevation angle of 15°, whereas it shows far more variation when the elevation angle reaches 45° and 60° than the polycarbonate phase difference plate. Specifically, the variation rate can be as much as eight times that at the elevation angle of 60° between the direction of the extension axis and that perpendicular to the extension axis.

In consequence, since the retardation of the polycarbonate phase difference plate shows its variation less than that of the polyvinyl alcohol phase difference plate as the elevation angle increases, the former, i.e. the polycarbonate phase difference plate is preferred to suppress the retardation variation with respect to the viewing angle (elevation angle).

Incidentally, when two phase difference plates are piled up phase addingly, as previously described, the cross angle between the slow axis of a phase difference plate at the first layer and the slow axis of a phase difference plate at the second layer should be 20° or more, otherwise the viewing angle is not spread effectively.

When two phase difference plates are piled up, in particular, it is effective to make use of the bearing in which the dependence on the elevation angle is minimized, as shown in FIG. 3. With this arrangement, it was found that if the phase difference plates are piled up in such a way that the slow axis of the phase difference plate at the second layer is directed parallel to the bearing in which the retardation variation of the phase difference plate at the first layer with respect to the elevation angle is minimized, the variation of retardation of the phase difference plate in combination with a liquid crystal display cell is suppressed with an enlarged viewing angle.

The fact that the slow axis of the phase difference plate at the second layer is superimposed in parallel on the direction in which the retardation variation of the phase difference plate at the first layer is minimized, means that the two phase difference plates coincide with each other in the direction in which their retardation is variation minimized. The result is that, in piled-up phase difference plates, the retardation value in their extended directions is prevented from being decreased and their retardation variation is rendered uniform, thereby the retardation difference in the extended direction is less and the viewing angle is enlarged.

For the cross angle between the slow axis of a phase difference plate at the first layer and that at the second layer, the optimum angle is proved to fall within the range of 20° to 40°.

In addition, due to the fact that a phase difference plate adjacent to the liquid crystal display cell is not subjected to color compensation unless it is disposed in the phase-subtracting manner with respect to the liquid crystal display cell, it proved that the slow axis of the phase difference plate adjacent to the liquid crystal display cell gives an optimum color compensation when it is at an angle of 70° to 90° with respect to the rubbing axis of the substrate adjacent to the liquid crystal display cell.

The conditions for disposing piled-up phase difference plates as described above will yield similar effects also in the case where the phase difference plates are disposed in the front and rear of the liquid crystal display cell or where piled-up phase difference plates are disposed on one face of the liquid crystal display cell and a single-layer phase difference plate is disposed on the other face thereof. In addition, the phase difference plates disposed in the front and rear of the liquid crystal display cell allow the liquid crystal display to have a wider viewing angle when they are placed symmetrically with respect to the liquid crystal display cell.

Furthermore, the present invention provides a liquid crystal display in which a first polarizing plate, a first phase difference plate, s supertwist type liquid crystal display cell, a second phase difference plate, and a second polarizing plate are piled-up and disposed in this order, wherein a uniaxial oriented polymer film having a large quantity of wavelength dispersion of retardation values is used as the first phase difference plate and the second phase difference plate;

the cross axes angle between the slow axis of the first phase difference plate and the first rubbing axis of the liquid crystal display cell adjacent to the first phase difference plate as well as the cross angle between the slow axis of the second phase difference plate and the second rubbing axis of the liquid crystal display cell adjacent to the second phase difference plate is 62° to 77°; and the cross angle between the absorbing axis of the first polarizing plate and the slow axis of the first phase difference plate is 29° to 38° and the cross angle between the absorbing axis of the second polarizing plate and the slow axis of the second phase difference plate is 55° to 62°.

According to the liquid crystal display with the above arrangement, a first polarizing plate, a first phase difference plate, a supertwist type liquid crystal display cell, a second phase difference plate, and a second polarizing plate are piled-up and disposed in this order, wherein a uniaxial oriented polymer film having a large quantity of wavelength dispersion of retardation values is each used as the first phase difference plate and the second phase difference plate. With the foregoing piling-up construction, the relative phase difference of the light (ordinary and extraordinary light) passing through the liquid crystal display cell is cancelled or equalized in phase by the transmission into the phase difference plates disposed on both faces of the liquid crystal display cell and the resultant light is achromatized.

In disposing the phase difference plates, the vibration plane of ordinary and extraordinary light passing through the phase difference plates and that of ordinary and extraordinary light passing through the liquid crystal display cell should be taken into consideration.

When the slow axes or leading axes of two phase difference plates differing from each other in retardation value are piled up at a cross angle of $\theta$, the effective retardation values of the above-mentioned piling-up construction result in an approximate equation with a high accuracy. On the basis of the approximate equation, while the cross angles $\theta$ made between the rubbing axis of the liquid crystal display cell and the individual slow axes of the phase difference plates disposed on both faces of the liquid crystal display cell were varied in turn within the range defined by the phase subtracting, the qualitative tendency of wavelength dispersion of retardation with the light beam finally emitted from the phase difference plate piled-up construction was calculated. Thus, it was found that the less the cross angle $\theta$, the less the wavelength dispersion of effective retardation values in the aforementioned phase difference plate piled-up construction while the wavelength dispersion of retardation values of the phase difference plate is large. It was further found that the less the cross angle $\theta$, the whiter the display when on-voltage as a selective waveform, is applied.

The above results are applicable when the arrangement is such that the cross angle between the slow axis of the first phase difference plate and the first rubbing axis of the liquid crystal display cell adjacent to the first phase difference plate is symmetrical with the cross angle between the slow axis of the second phase difference plate and the second rubbing axis of the liquid crystal display cell adjacent to the second phase difference plate with respect to the liquid crystal display cell. Like tendency as here mentioned was found true in the case where the arrangement is such that the cross angle between the slow axis of the second phase difference plate and the second rubbing axis of the liquid crystal display cell adjacent to the second phase difference plate is less than the cross angle between the slow axis of the first phase difference plate and the first rubbing axis of the liquid crystal display cell adjacent to the first phase difference plate by 5°, asymmetrical with respect to the liquid crystal display cell.

Accordingly, through further investigation of the disposition conditions in detail on the basis of these tendencies and the evaluation of whiteness level derived from the CIE chromaticity coordinates, it was shown that a display with a superior whiteness level and good contrast can be obtained when the cross angle between the slow axis of the first phase difference plate and the first rubbing axis of the liquid crystal display cell adjacent to the first phase difference plate and the cross angle between the slow axis of the second phase difference plate and the second rubbing axis of the liquid crystal display cell adjacent to the second phase difference plate are 62° to 77°, the cross angle between the absorbing axis of the first polarizing plate and the slow axis of the first phase difference plate is 29° to 38°, and the cross angle between the absorbing axis of the second polarizing plate and the slow axis of the second phase difference plate is 55° to 62°.

In particular, when the absorbing axis of one of the polarizing plates disposed on both faces of the liquid crystal display cell and the transmitting axis (vertical component of the absorbing axis) of the other polarizing plate are disposed symmetrically with respect to the liquid crystal display cell, the display will be of a high whiteness level and a maximum contrast.

As a consequence, a liquid crystal display can be realized which provides clear black-and-white display while keeping its contrast higher, compared with conventional phase difference plate supertwist type liquid crystal displays and which is also the most suitable for gradation display of less color variation due to voltage fluctuation.

DETAILED DESCRIPTION OF THE PREFERRED EMBODIMENT

EMBODIMENT 1

An embodiment of the present invention is described below with reference to FIGS. 6 and 7.

Figure 6:
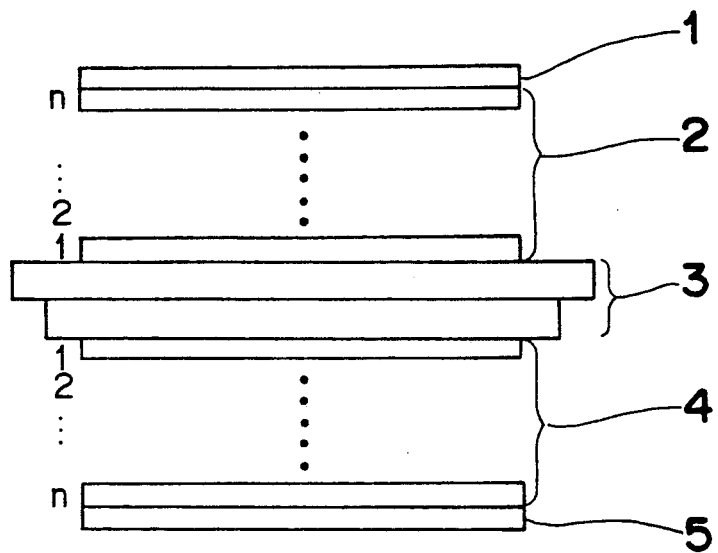
FIG. 6 is a view illustrating the arrangement of a liquid crystal display for the explanation of an embodiment of the present invention.

FIG. 6 is a view illustrating the construction of an embodiment of the present invention to be described below, wherein the reference numerals 1, 2, 3, 4 and 5 denote an upper polarizing plate, upper piled phase difference plate, STN liquid crystal cell, lower piled phase difference plate, and lower polarizing plate, respectively. The upper polarizing plate 1 was composed of a neutral gray type polarizing plate with a simple-substance transmittance of 42% and a degree of polarization of 99.99%, the upper piled phase difference plate 2 was composed of a uniaxial oriented polymer film (polycarbonate) with a thickness of 50 μm and a piling-up retardation value of 380 to 580 nm, and the STN liquid crystal cell 3 is composed of a panel with a twist angle of 240° and a setting of dΔn (d: liquid crystal layer thickness, Δn: value of refractive index anisotropy)=0.83 to 0.92 μm, into which LC material having a levorotatory chiral dopant added was sealed. The lower piled phase difference plate 4 was of the same number and the same retardation value as the upper piled phase difference plate 2. Further the lower polarizing plate 5 was also the same as the upper polarizing plate 1.

With this arrangement, the disposing location in piling individual component members is described with reference to FIG. 7.

Figure 7:
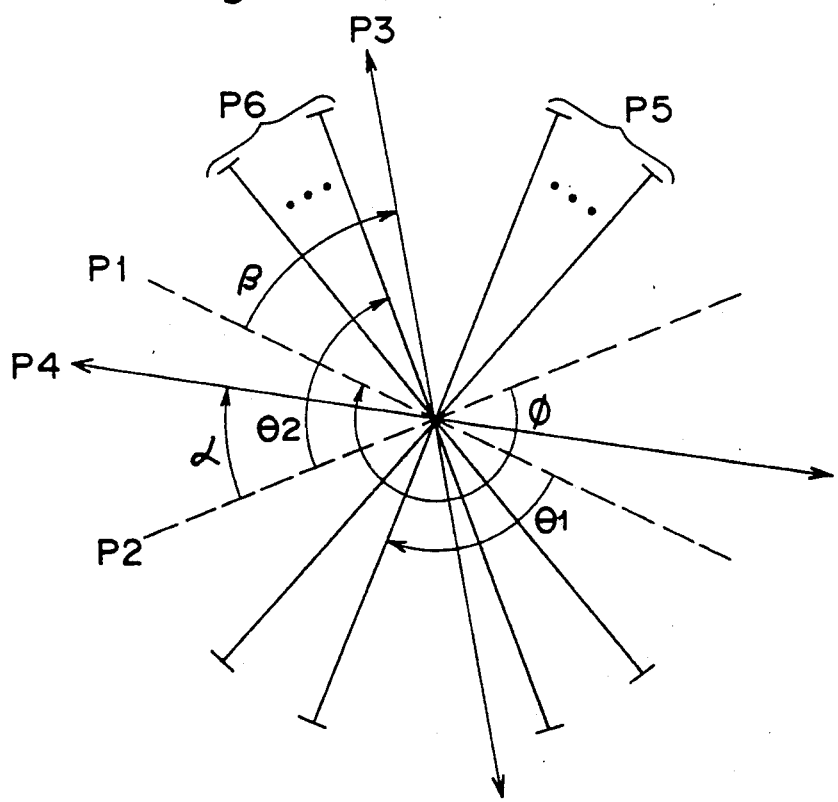
FIG. 7 is a plan view showing the positional arrangement of the same embodiment.

Out of the arrows shown in FIG. 7, an arrow P1 shows a liquid crystal molecular orientation axis of an upper substrate forming the STN liquid crystal cell 3, an arrow P2 shows a liquid crystal molecular orientation axis of a lower substrate of the same, an arrow P3 shows the absorbing axis of the upper polarizing plate 1, an arrow P4 shows the absorbing axis of the lower polarizing plate 5, an arrow P5 shows the slow axis (in the extended direction) of a phase difference plate adjacent to the STN liquid crystal cell of the upper piled phase difference plate 2, and an arrow P6 shows the slow axis in the extended direction of a phase difference plate adjacent to the STN liquid crystal cell of the lower piled phase difference plate 4. Further, θ1 shows an angle formed between the liquid crystal molecular orientation axis P1 of the upper substrate and the slow axis of the phase difference plate adjacent to the STN liquid crystal cell of the upper piled phase difference plate P5, θ2 shows an angle formed between the liquid crystal molecular orientation axis P2 of the lower substrate and the slow axis of the phase difference plate adjacent to the STN liquid crystal cell of the lower piled phase difference plate P6. Finally, α shows an angle formed between the liquid crystal molecular orientation axis P2 of the lower substrate and the absorbing axis P4 of the lower polarizing plate, and β shows an angle formed between the liquid crystal molecular orientation axis P1 of the upper substrate and the absorbing axis P3 of the upper polarizing plate.

The present invention in one preferred embodiment, in which the upper piled phase difference plate is disposed symmetrically with the lower piled phase difference plate, is provided with a condition, $$\theta 1 + \theta 2 = 180° \text{ (constant)}$$

To pile up phase difference plates, the color compensation should be ensured in the piled-up state. Accordingly, we first discussed the optimization of the positioning arrangement of phase difference plates without piling up the phase difference plates.

A phase difference plate having a retardation value of 580 nm was used as the upper phase difference plate with a liquid crystal cell 3 having the dΔn value of 0.83 μm and a twist angle of 240°. With the settings of $\theta 1 = 50°$, 60°, 70°, 80°, 90°, 100° and 110°, the color compensation was examined, where α and β were optionally moved and controlled so as to give black-and-white display. As a result, it was found that the color compensation can be obtained if $\theta 1 = 70°$ to 90°.

Next, phase difference plates having a retardation value of 400 nm were used as the upper and lower phase difference plates, with the liquid crystal cell 3 having the dan value of 0.92 μm and a twist angle of 240°. With the settings of $\theta = 50°$, 60°, 70°, 80°, 90°, 100° and 110°, and $\theta 2 = 130°$, 120°, 110°, 100°, 90°, 80° and 70°, the color compensation was examined, with the result that $\theta 1 = 70°$ to 90° also enables the color compensation.

In this case, it was found that the more the color compensation the wider the viewing angle. Then, in piling up phase difference plates, we determined that the phase difference plate adjacent to the liquid crystal cell is disposed within the range of $70° \leq \theta 1 \leq 90°$ ($90° \leq \theta 2 \leq 110°$).

EMBODIMENT 1-a

In this embodiment, phase difference plates are piled up in such a way that a phase difference plate adjacent to the liquid crystal cell is assigned to the first layer, on which are piled up the second, the third, and so on. Two upper piled phase difference plates 2 are piled up, phase difference plates having a retardation of 400 nm being used as the first and second layers, and a liquid crystal cell 3 having a dΔn of 0.92 μm and a twist angle of 240° is utilized. With the setting of $\theta 1 = 70°$ and the cross angle between the slow axes (in the extended direction) of the phase difference plates at the first and second layers set to 0°, 10°, 20°, 30°, 40° and 50°, we looked into viewing angle and color compensation, thus having established that a cross angle within the range of 20° to 40° gives a good result and, in particular, that of 25° is the optimum. In this case, $\alpha = 40°$ and $\beta = 50°$, and the viewing angle proved to be approximately 7° wider than when the phase difference plate are not piled up.

EMBODIMENT 1-b

In this embodiment, two upper piled phase difference plates 2 are piled up, phase difference plates having a retardation of 200 nm being used as the first and second layers, and a liquid crystal cell 3 having a dΔn of 0.90 μm and a twist angle of 240° is utilized. The lower piled phase difference plate 4 is not piled up and a single plate having a retardation of 400 nm is used for it. With the settings of $\theta 1$ 90° and $\theta 2 = 90°$ and the cross angle between the slow axes (in the extended direction) of the phase difference plates at the first and second layers set to 0°, 10°, 20°, 30°, 40° and 50°, we looked into viewing angle and color compensation, thus having established that a cross angle within the range of 20° to 40° gives a good result and, in particular, that of 30° is the optimum. In this case, 130° and $\beta = 20°$, and the viewing angle proved to be approximately 5° wider in the viewing angle direction and approximately 3° wider in the counter viewing angle direction than when the phase difference plates are not piled up.

EMBODIMENT 1-c

In this embodiment, two upper piled phase difference plates 2 are piled up, phase difference plates having a retardation of 200 nm being used as the first and second layers, while two lower piled phase difference plates 4 are piled up, phase difference plates having a retardation of 200 nm being used as the first and second layers. A liquid crystal cell 3 having a dan of 0.90 μm and a twist angle of 240° is utilized. With the setting of $\theta 1 = 90°$ and the cross angles between the slow axes (in the extended direction) of both the upper piled phase difference plate 2 and the lower piled phase difference plate 4 at the first and second layers set to 0°, 10°, 20°, 30°, 40° and 50°, we looked into viewing angle and color compensation, thus having established that a cross angle within the range of 20° to 40° gives a good result and, in particular, that of 30° is the optimum. In this case, $\alpha = 80°$ and $\beta = 5°$, and the viewing angle proved to be approximately 2° wider in the viewing angle direction and approximately 7° wider in the counter viewing angle direction than when the phase difference plates are not piled up.

Figure 8:
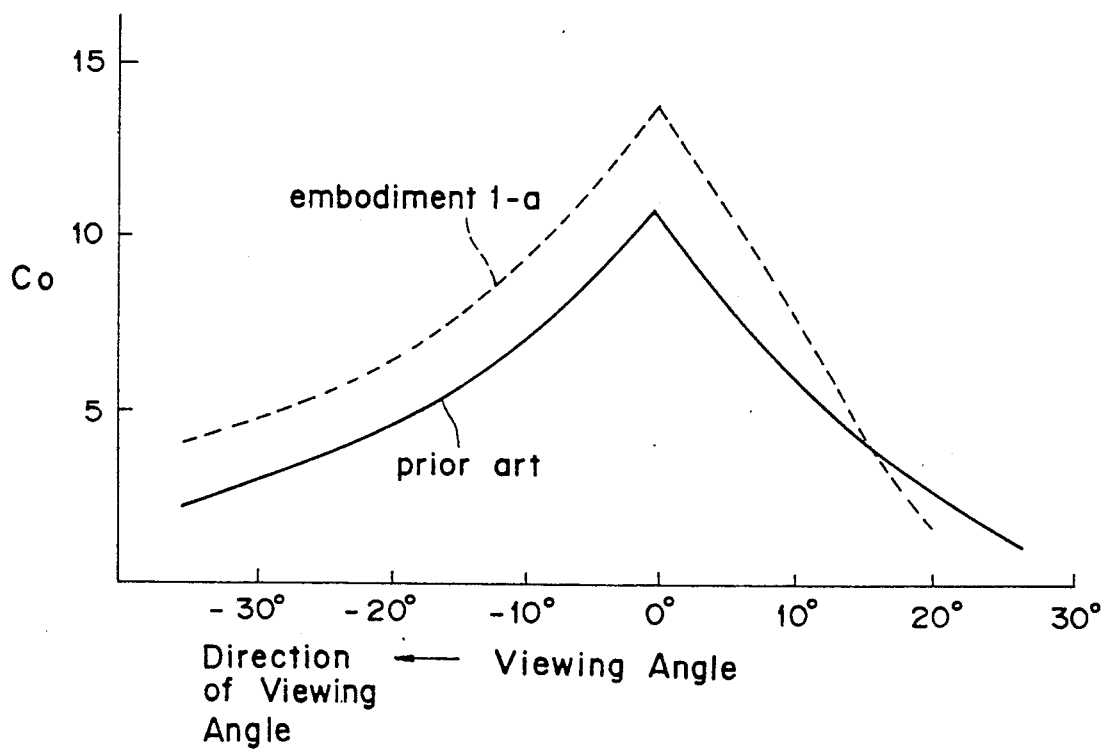
FIG. 8 is a figure showing the results of measuring the viewing angle characteristic for an optimum combination in the case of embodiment 1-a.
Figure 9:
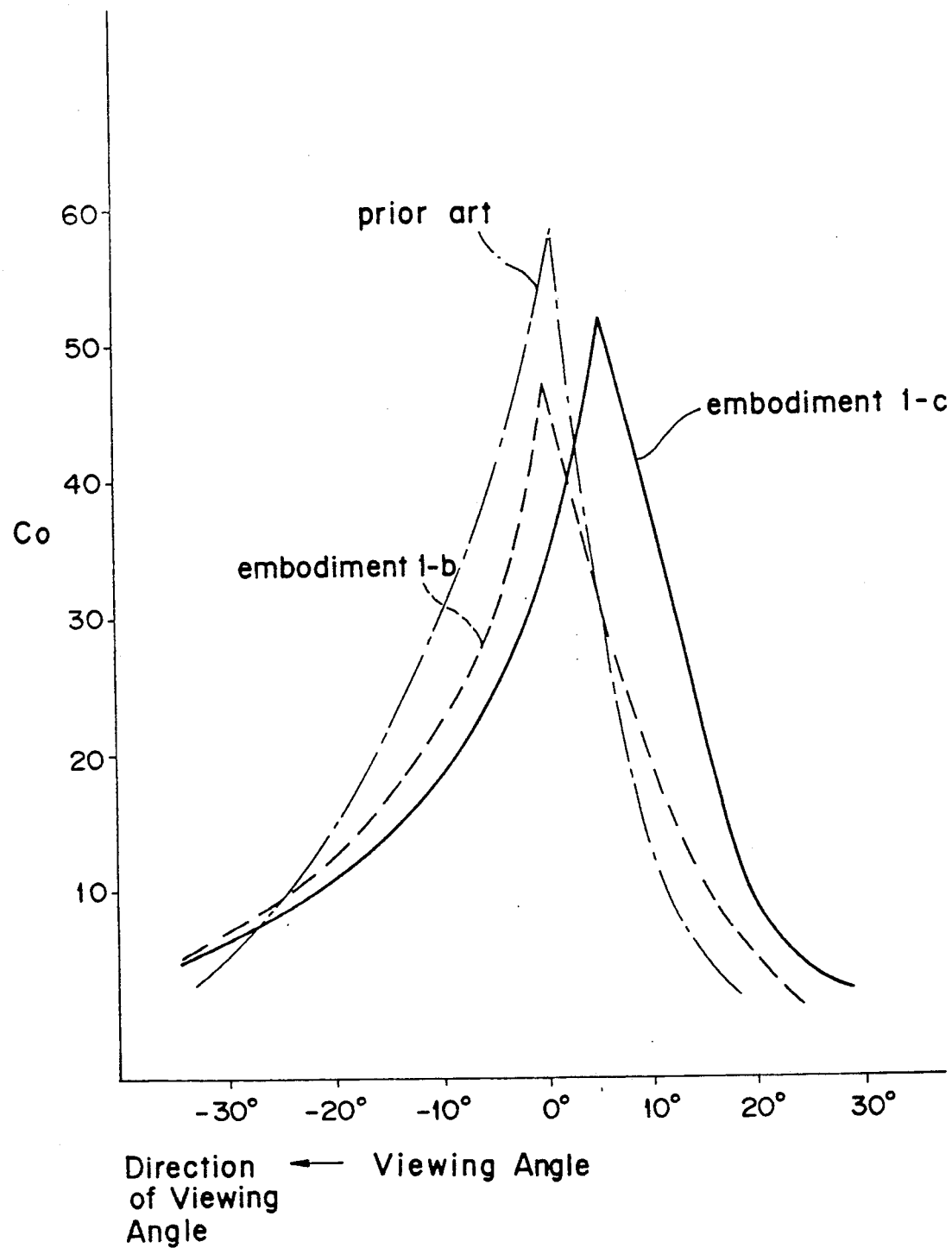
FIG. 9 is a figure showing the results of measuring the viewing angle characteristic for optimum combinations in the cases of embodiments 1-b and 1-c.

Out of the above embodiments, taking the case of the optimum combination in embodiment 1-a, the results of measuring the viewing angle characteristic are shown in FIG. 8. Likewise, the results are shown in FIG. 9 from measuring the viewing angle characteristic in the cases of the optimum combinations in embodiments 1-b and 1-c.

EMBODIMENT 2

EMBODIMENT 2-a

In this embodiment, two upper piled phase difference plates 2 are piled up, phase difference plates having a retardation of 200 nm being used as the first and second layers, and a liquid crystal cell 3 having a dan of 0.91 μm and a twist angle of 240° is utilized. The liquid crystal cell 3 in this application is a high-speed response cell having a sharpness of 1.12 and a response time (a sum of rise time and decay time) of approximately 70 ms.

The lower piled phase difference plate 4 is not piled up and a single phase difference plate having a retardation of 417 nm is utilized. With the settings of $\theta 1 = 85°$ and $\theta 2 = 95°$, the cross angle between the slow axes (in the extended direction) of the phase difference plates at the first and second layers is set to 30°, where $\alpha = 45°$ and $\beta = 100°$.

We then looked into the viewing angle and found that the viewing angle proved to be approximately 6° wider in the viewing angle direction and approximately 3° wider in the counter viewing angle direction than when the phase difference plates are not piled up.

Figure 10:
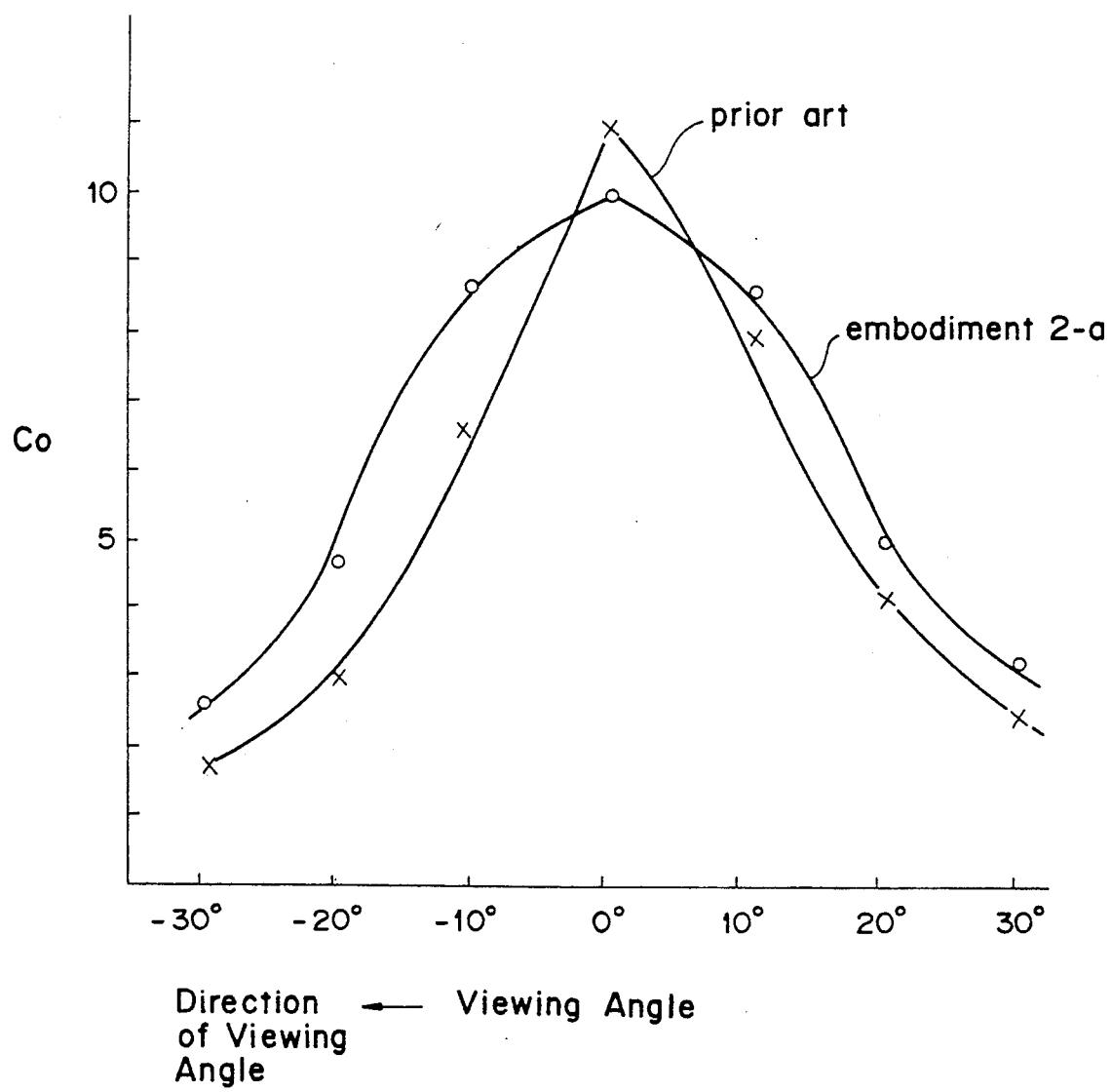
FIG. 10 is a figure showing the results of measuring the viewing angle characteristic in the case of embodiment 4.

The viewing angle characteristic in the case of embodiment 2-a is shown in FIG. 10.

Figure 11:
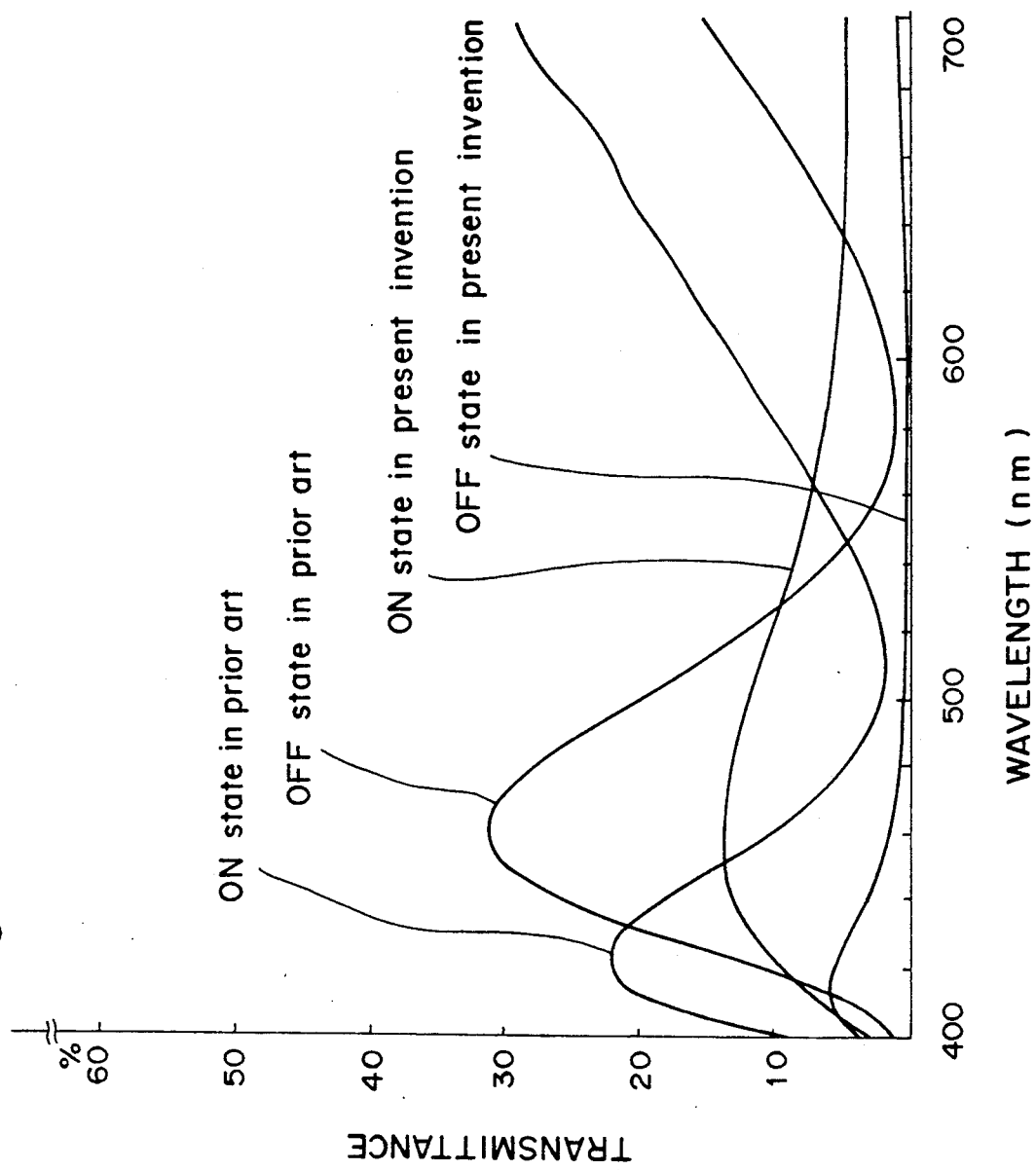
FIG. 11 is a figure illustrating the spectral transmittance of embodiment 4.
Figure 12:
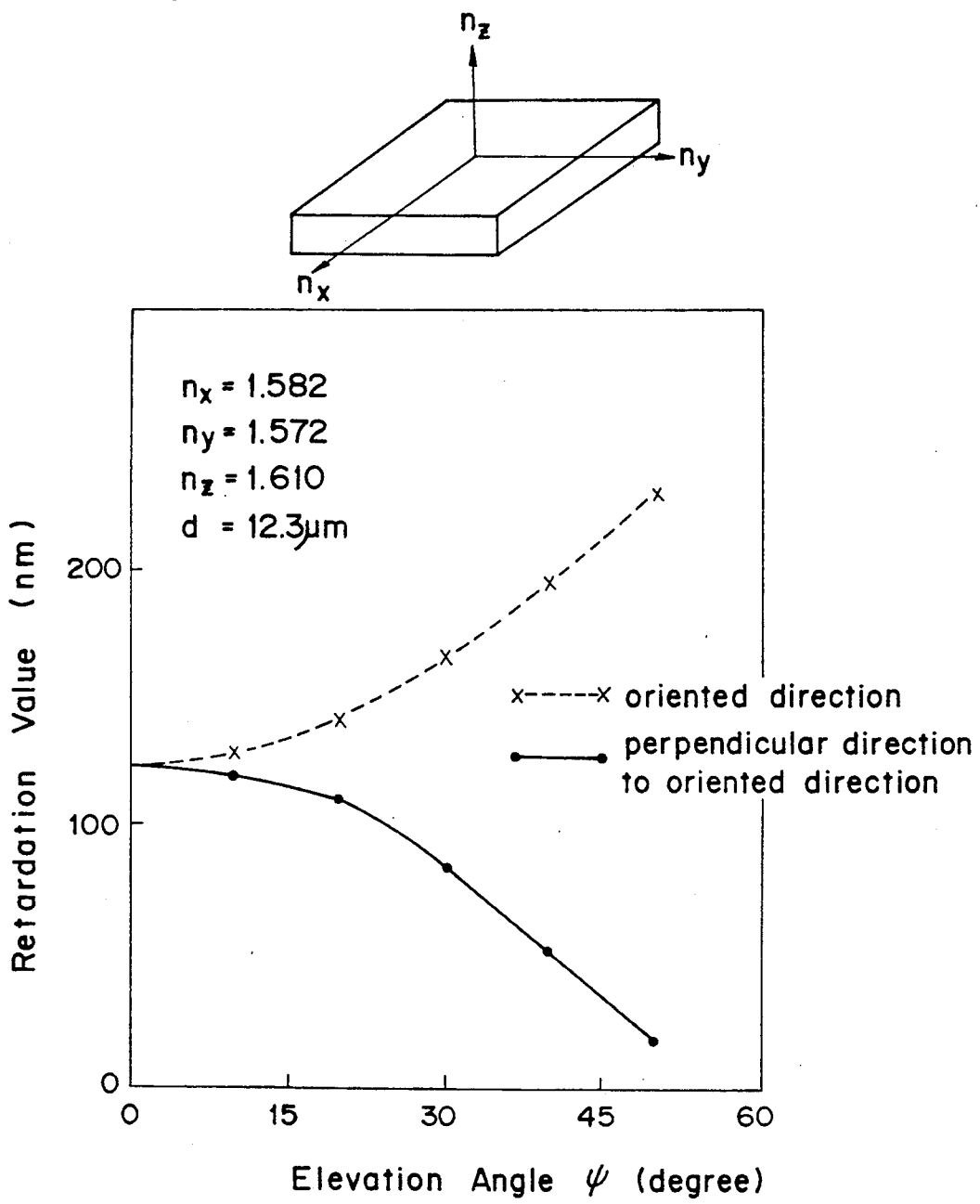
FIG. 12 is a figure in which the retardation variation of the viewing angle compensator with respect to elevation angle was obtained through calculation.

Further the spectral transmittances in both the cases where the present invention is applied in embodiment 2-a and not therein are shown in FIG. 11. In this examination, the response time is 70 ms (at 25°) for 1/240 D 1/13B whether the present invention is applied or not. As to the color tone and contrast, as apparent from FIG. 11, the case where the invention is applied shows a flatter spectral curve and moreover a higher ON- and OFF-transmitting light quantity than the other, resulting in high-speed response as well as high-contrast, clear displays.

EMBODIMENT 3

This embodiment of the present invention is described below with reference to FIGS. 13 and 14.

A polymer material having its polarization in the direction perpendicular to that of its principal chain, such as PMMA (polymethyl methacrylate), EMA (ethylene methacrylate), and PS (polystyrene), forms a polymer film the maximum refractive index of which is directed in its thickness direction through film formation by way of extension. The polymer film forms a viewing angle compensator applied to the present invention. Shown below is an embodiment in which polystyrene is used.

Figure 13:
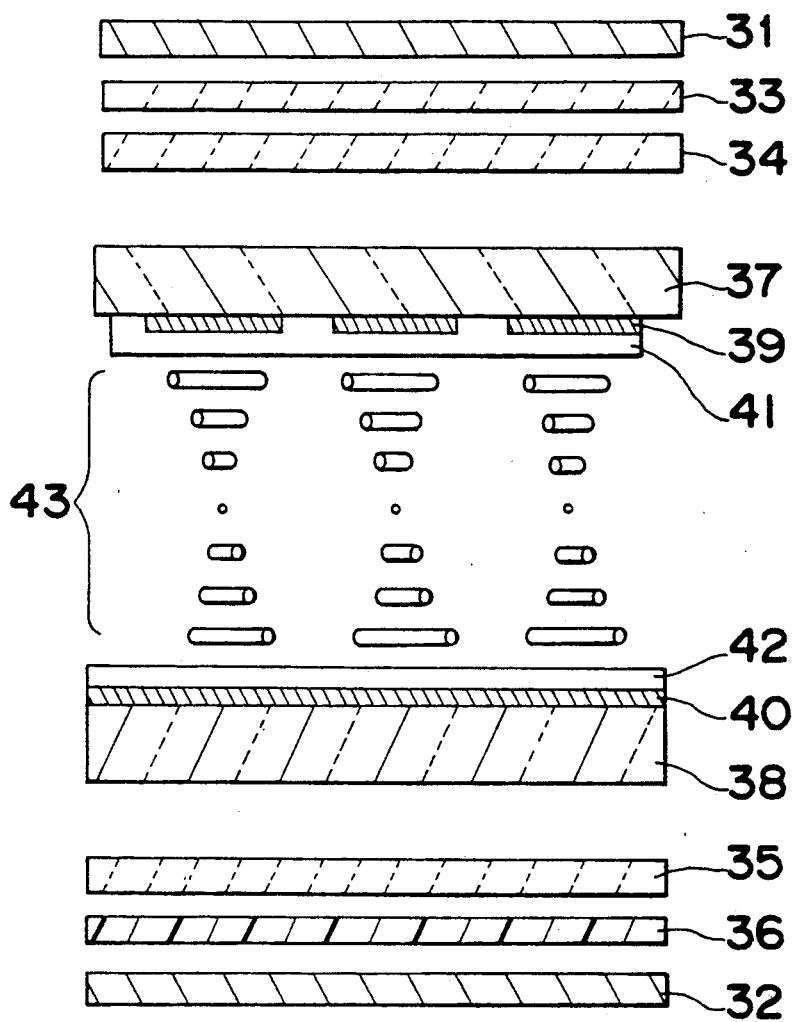
FIG. 13 is a sectional view of a liquid crystal display of an embodiment according to the present invention.

FIG. 13 is an exploded sectional view of a liquid crystal display of an embodiment of the present invention.

Polarizing plates 31, 32 are neutral gray type polarizing plates having a simple substance transmittance of 42% and a degree of polarization of 99.99%. Phase difference plates 33, 34, 35 with a thickness of 50 μm are each composed of a uniaxial oriented polymer film (polycarbonate), their retardation values being 200 nm, 200 nm, and 400 nm, respectively. A viewing angle compensator 36 is made of polystylene, having an in-plane retardation value of 50 nm and that in the direction of thickness of 90 nm. Glass substrate 37, 38 have transparent electrodes ITO 39, 40 formed thereon and further thereon organic orientation films 41, 42 also formed, wherein a liquid crystal layer 43 is rubbing orientation treated so as to give a 240° twist structure.

As a material of the liquid crystal layer 43, a nematic liquid crystal having a positive dielectric anisotropy, for example, a mixed liquid crystal in which 1.45% by weight cholesteric nonanate (CN) is added to phenyl cyclohexane as a chiral dopant to regulate the twist direction is used. The refractive index anisotropy of the mixed liquid crystal Δn is 0.123 and the thickness of the liquid crystal layer 43 is set to 7.5 μm.

Figure 14:
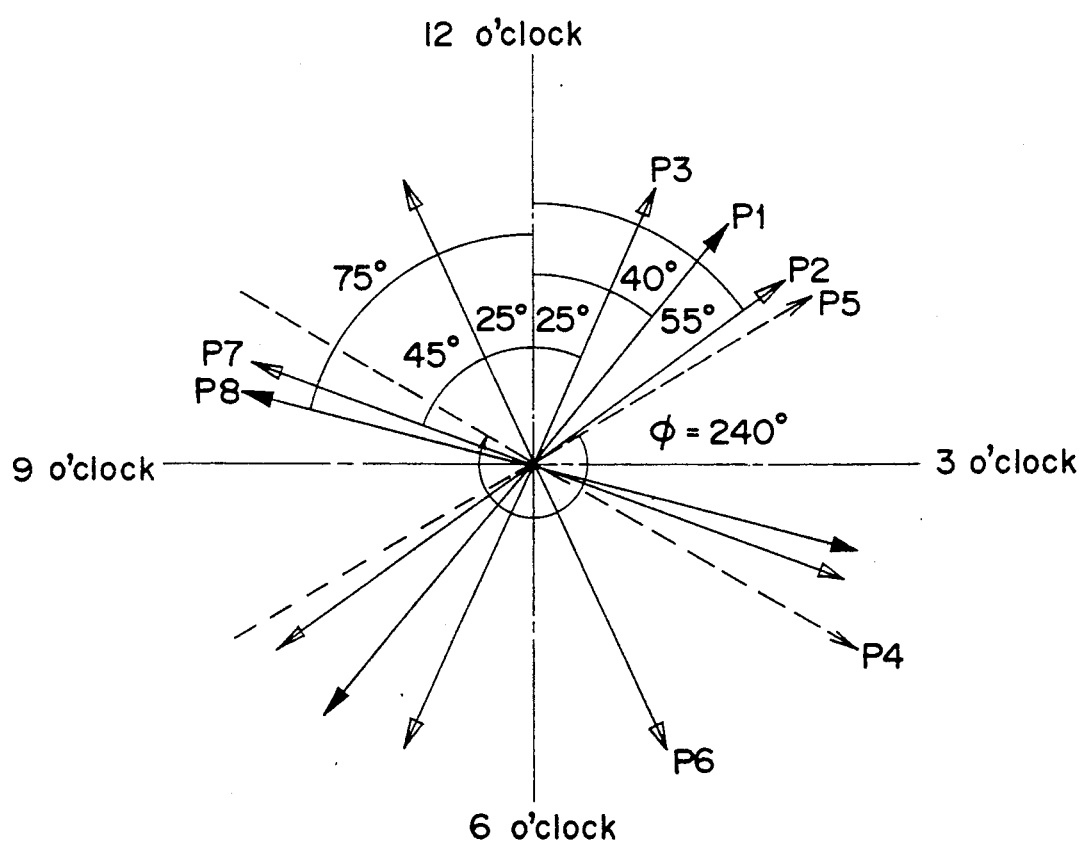
FIG. 14 is a figure showing the disposition conditions for each member of the embodiment according to the invention.

FIG. 14 is a figure showing the conditions for disposing the members of the present embodiment. An arrow P1 shows the direction of the absorbing axis of the front side polarizing plate 31, forming an angle of 40° from the 12 o'clock direction to the 3 o'clock direction, an arrow P2 shows the direction of the slow axis of the phase difference plate 33 adjacent to the polarizing plate 1, forming an angle of 55° from the 12 o'clock direction to the 3 o'clock direction, and an arrow P3 shows the direction of the slow axis of the phase difference plate 34 adjacent to the glass substrate 37, forming an angle of 25° from the 12 o'clock direction to the 3 o'clock direction. In this case, the cross angle between the slow axes of piled phase difference plates 33 and 34 is 30°. Arrows P4 and P5 show the liquid crystal molecular orientation axes (rubbing axes) of the upper glass substrate 37 and lower glass substrate 38, respectively, twisted by 240° clockwise. An arrow P6 shows the direction of the slow axis of the phase difference plate 35 adjacent to the lower glass substrate 38, forming an angle of 25° from the 12 o'clock direction to the 9 o'clock direction, an arrow P7 shows the extended direction of the viewing angle compensator 36, forming an angle of 45° with respect to P6, and an arrow P8 shows the direction of the absorbing axis of the lower polarizing plate 32, forming an angle of 75° from the 12 o'clock direction to the 9 o'clock direction.

Figure 15:
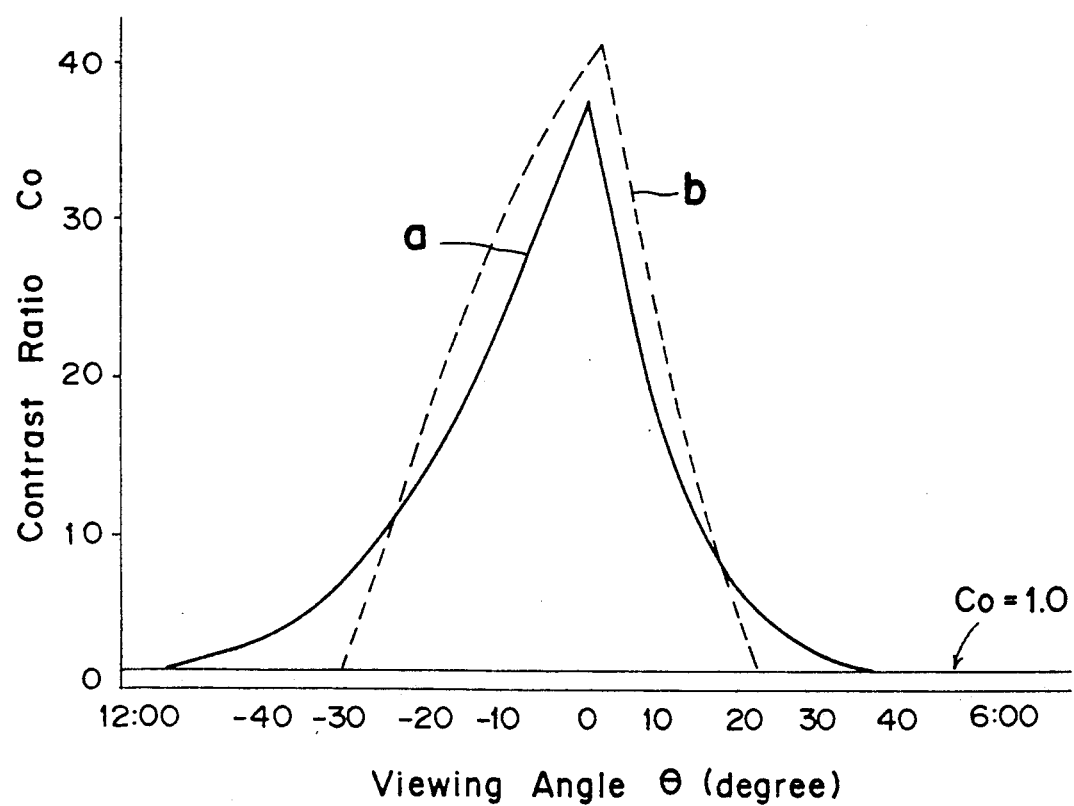
FIG. 15 is a figure for comparing the embodiment of the invention and its conventional counterpart in the viewing angle-contrast characteristic.
Figure 16:
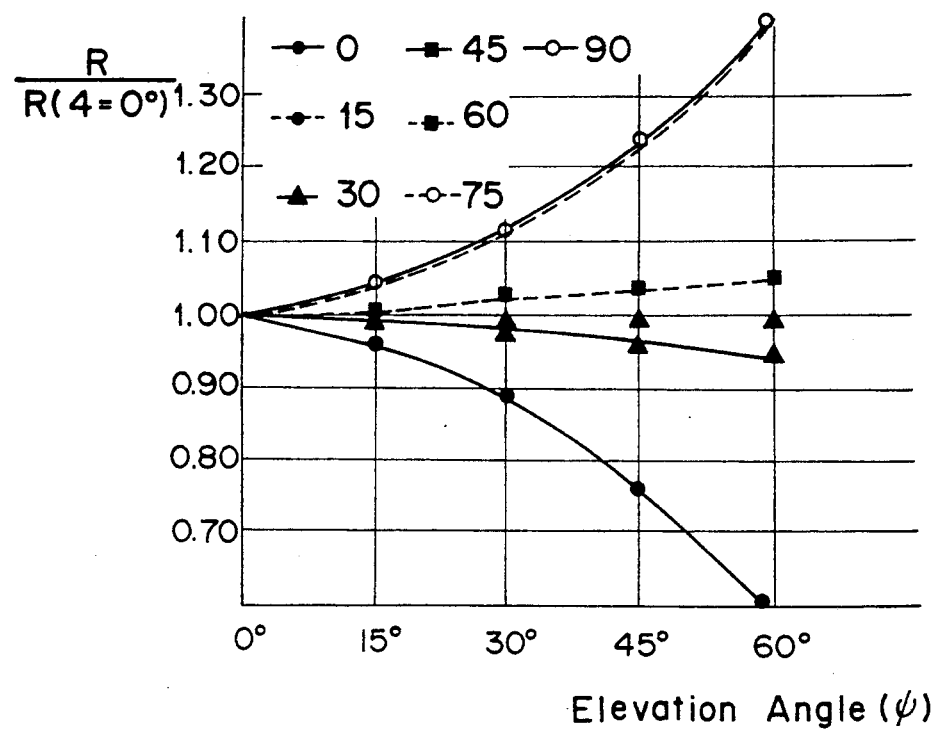
FIG. 16 is a figure showing the relationship of retardation variation to measured elevation angles in a polyvinyl alcohol phase difference plate.

FIG. 15 is a figure showing the viewing angle-contrast characteristics when viewed from the a plane including the direction of 12-6 o'clock in the cases of the present embodiment and conventional counterpart. The characteristic curve of the present invention is designated by a and that of the conventional counterpart is designated by b. When compared in a viewing angle range where the black-and-white display is reversed, i.e. the contrast ratio Co is not more than 1.0, the viewing angle of the present embodiment is 94°, which is approximately 1.8 times that of the conventional counterpart, 52°. In this case, the conventionally counterpart refers to the arrangement in which one phase difference plate is each disposed in the front and rear of the STN liquid crystal display panel.

EMBODIMENT 4

In FIG. 6, there are three cases where no lower phase difference plate 4 is disposed, a single layer phase difference plate is disposed, and two phase difference plates are disposed as the phase difference plates 4. When piled-layer phase difference plates or a single-layer phase difference plate is disposed, a phase difference plate is composed of a uniaxial oriented polymer film made from polycarbonate, having the same retardation value as that of the upper phase difference plate 2. The lower polarizing plate 5 used is also of the same kind as the upper polarizing plate 1.

The disposition location for piling up the component members in this case is the same as shown in the foregoing description for FIG. 7, with an exception of the condition, $\theta 1 + \theta 2 = 180°$ (constant).

EMBODIMENT 4-a

In this embodiment, like the aforementioned embodiment 1-a, phase difference plates are piled up in such a way that the phase difference plate adjacent to the liquid crystal cell is assigned to the first layer, followed by the second layer piled thereon. Each phase difference plate is composed of a polycarbonate uniaxial oriented polymer film, two plates of this kind being piled up. Incidentally, the present embodiment 4-a is the case where no lower phase difference plate 4 is disposed, and the rest of the arrangement conditions of the embodiment are the same as in embodiment 1-a.

With the setting of $\theta 1 = 70°$ and the cross angle (in the extended direction) between the slow axes of the phase difference plates at the first and second layers set to 0°, 10°, 20°, 30°, 40° and 50°, we looked into viewing angle and color compensation, thus having established that a cross angle within the range of 20° to 40° gives a good result and, in particular, that of 25° is the optimum. In this case, $\alpha = 40°$ and $\beta = 50°$, and the viewing angle proved to be 29° in the viewing angle direction and 14° in the counter viewing angle direction, being approximately 7° wider in the viewing angle direction than when phase difference plates are not piled up.

COMPARATIVE EXAMPLE 1

In the arrangement of the preceding embodiment 4-a, the material of each of the upper piled phase difference plates is changed from polycarbonate into polyvinyl alcohol, the rest of the construction, conditions or the like being entirely the same as described in embodiments 1-a and 4-a. Through the examination of the viewing angle with the crossed axes angle set to 25°, the viewing angle in the comparative example 1 proved to be 20° in the viewing angle direction and 12° in the counter viewing angle direction, i.e. approximately 9° narrower in the viewing angle direction and 2° narrower in the counter viewing angle direction than when polycarbonate phase difference plates are used in embodiment 1.

COMPARATIVE EXAMPLE 2

With the arrangement of embodiment 1-b, the material of each phase difference plate of the upper piled phase difference plates 2 and the single lower piled phase difference plate 4 is changed from polycarbonate into polyvinyl alcohol. Like the preceding case, the rest of the construction, conditions or the like being entirely the same as described in embodiments 1-a and 4-a, but with an exception that the material of the upper piled phase difference plates is polycarbonate since no polyvinyl alcohol phase difference plate having a retardation of 200 nm is present. Through the examination of the viewing angle with the cross angle set to 30°, the viewing angle in the comparative example 2 proved to be 35° in the viewing angle direction and 14° in the counter viewing angle direction, i.e. approximately 9° narrower in the counter viewing angle direction than when polycarbonate phase difference plates are used in embodiment 1-b.

Figure 1:
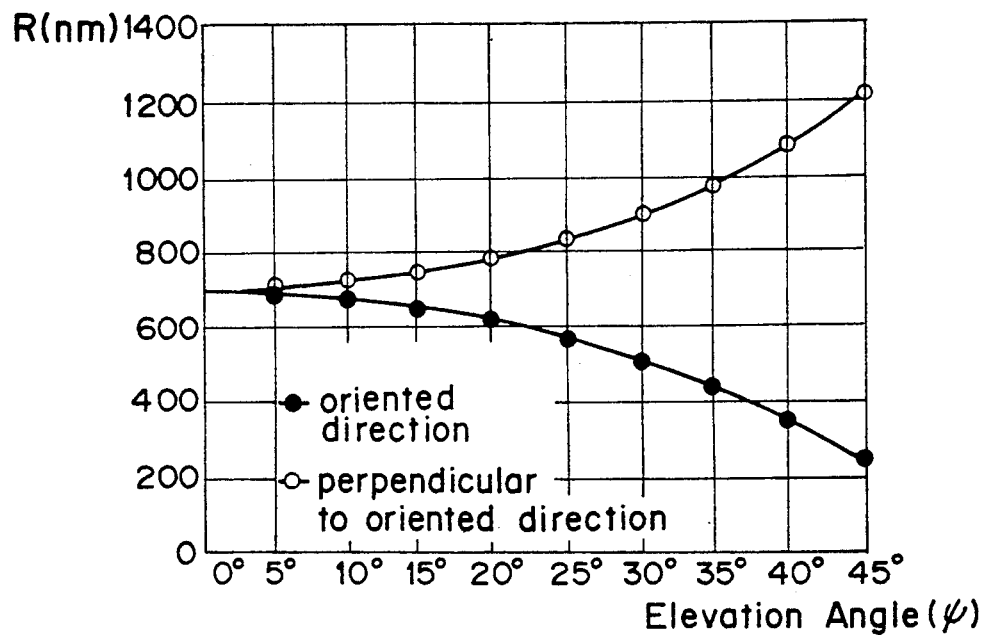
FIG. 1 is a figure showing the relationship of retardation variation of a phase difference plate to the elevation angle obtained through the theoretical equations.
Figure 2:
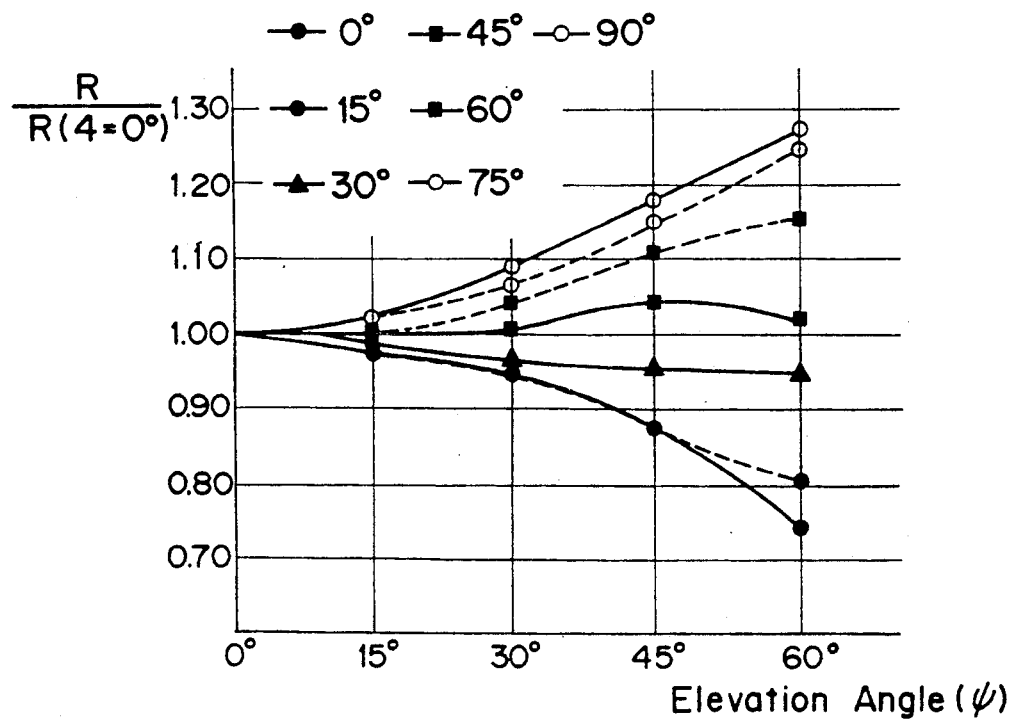
FIG. 2 is a figure showing the relationship of retardation variation of a phase difference plate to measured elevation angles.
Figure 3:
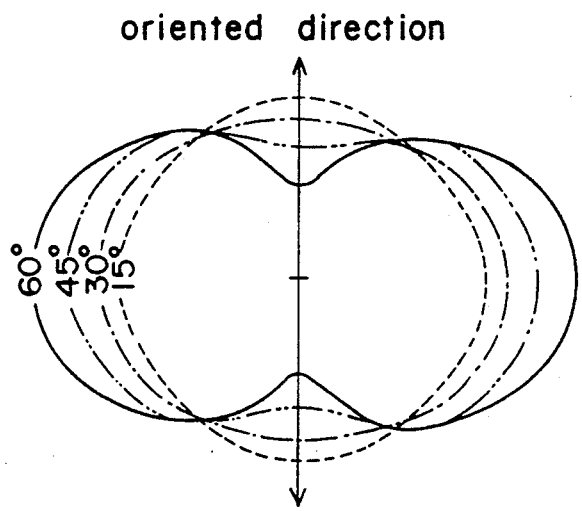
FIG. 3 is a figure showing the relationship of retardation variations in all the bearings of a phase difference plate.
Figure 4:
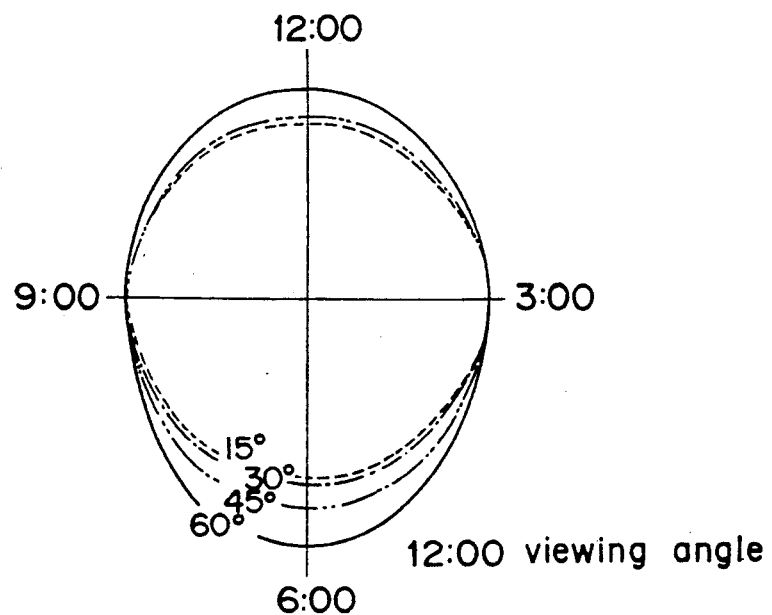
FIG. 4 is a figure showing the relationship of retardation variations in all the bearings of a liquid crystal panel.
Figure 5:
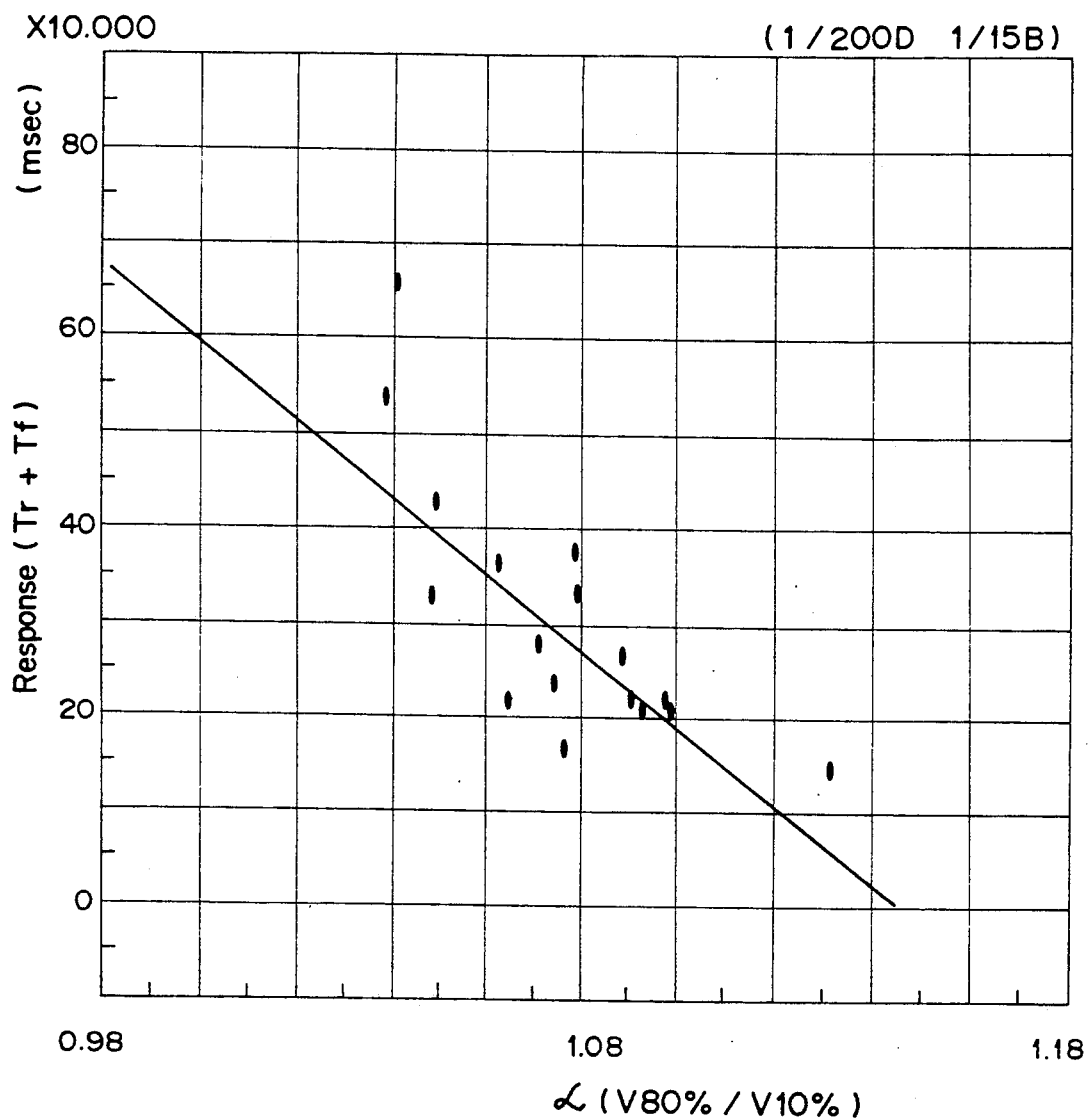
FIG. 5 is a figure showing the relationship between the sharpness and response time of a liquid crystal material.
Figure 17:
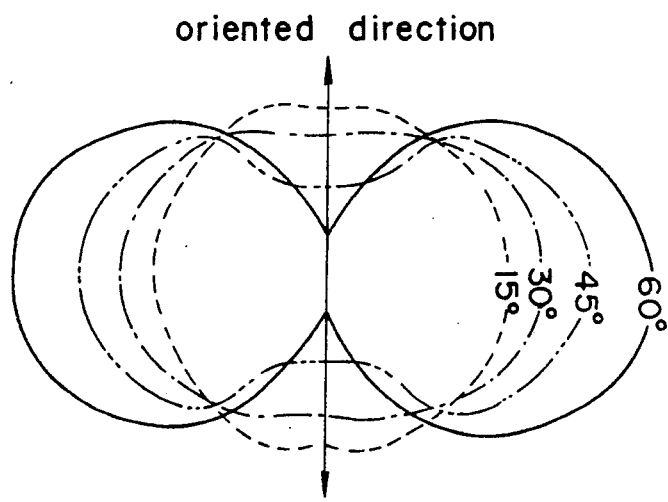
FIG. 17 is a figure showing the relationship of retardation variation to the all the bearings in a polyvinyl alcohol phase difference plate.

As is apparent from the results in the comparative examples 1 and 2, a liquid crystal display utilizing polycarbonate phase difference plates affords wider viewing angles than that utilizing polyvinyl alcohol phase difference plates. This is attributed to that, as shown in FIGS. 3 and 17, a polycarbonate phase difference plate shows no retardation variation due to bearing at elevation angles of 15° and 30°, and even the retardation change rates at elevation angles of 45° and 60° amount to one fourth that of a polyvinyl alcohol phase difference plate.

The comparison table is shown below between embodiments 4-a, 1-b and comparative examples 1, 2.

|  | Embodiment 4-a | Comparative example 1 |
|---|---|---|
| Viewing angle in the viewing angle direction | 29° | 20° |
| Viewing angle in the counter viewing angle direction | 14° | 12° |
| Range of viewing angle | 43° | 32° |
| Value of contrast | 8.5 | 8.5 |

|  | Embodiment 1-b | Comparative example 2 |
|---|---|---|
| Viewing angle in the viewing angle direction | 33° | 36° |
| Viewing angle in the counter viewing angle direction | 26° | 14° |
| Range of viewing angle | 56° | 50° |
| Value of contrast | 22.0 | 22.0 |

Figure 18:
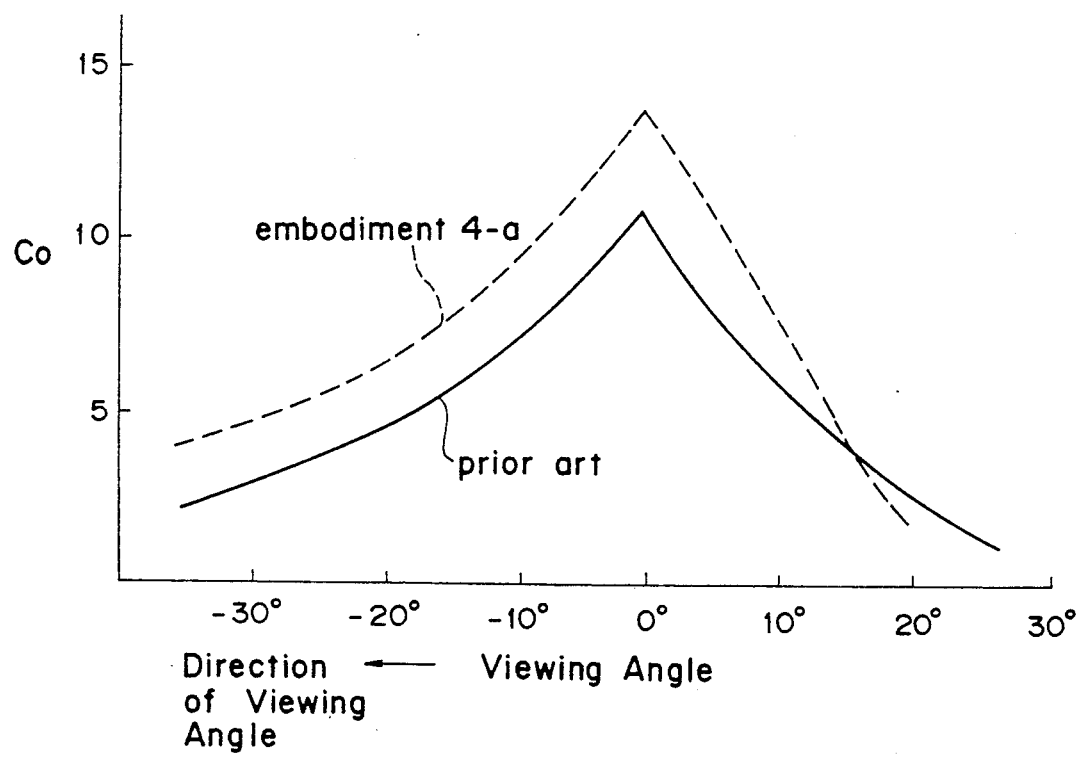
FIG. 18 is a figure showing the results of measuring the viewing angle characteristic for an optimum combination in the case of embodiments 4-a.
Figure 19:
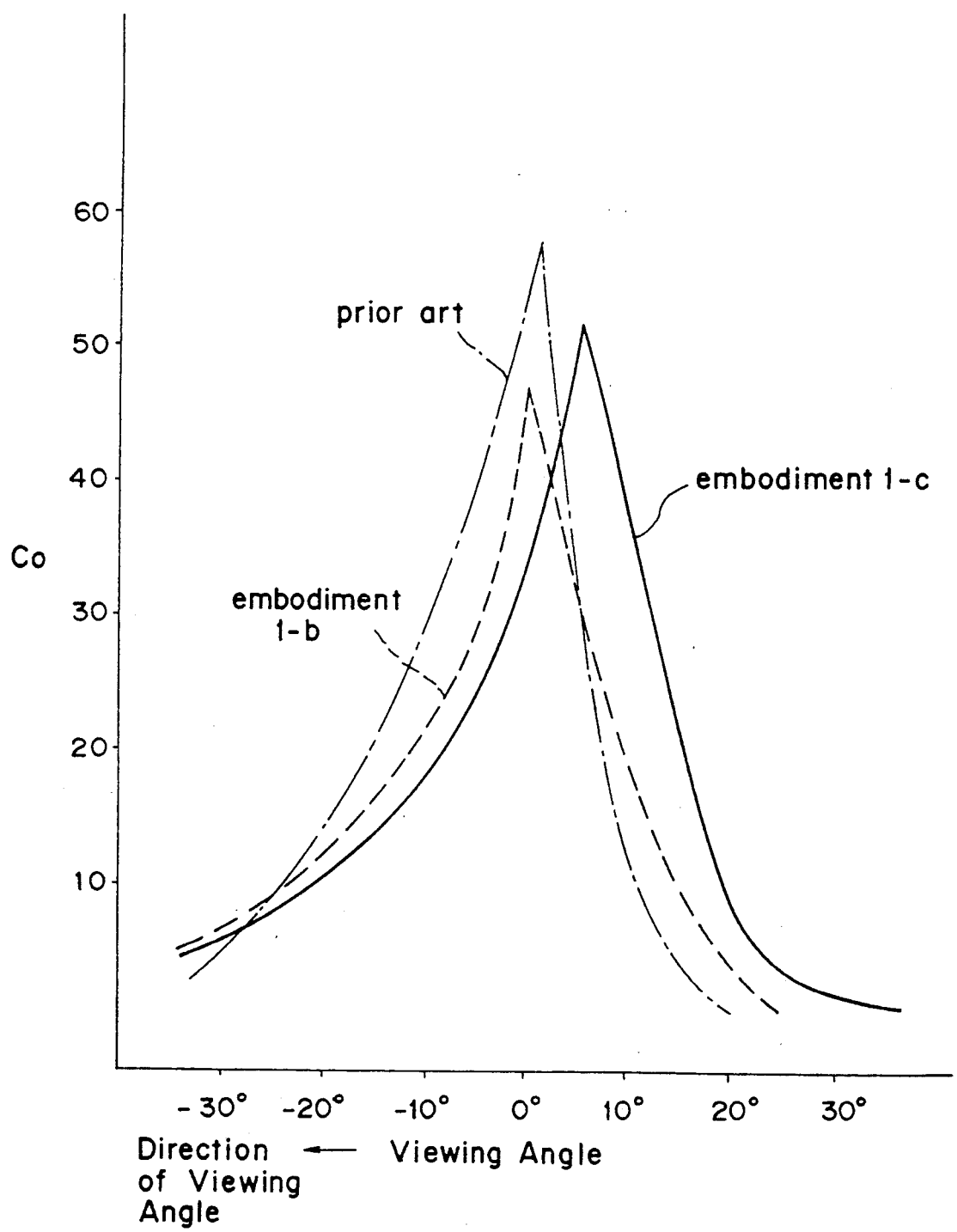
FIG. 19 is a figure showing the results of measuring the viewing angle characteristic for optimum combinations in the cases of embodiments 1-b and 1-c.

Out of the above embodiments, taking the case of the optimum combination in embodiment 4-a, the results of measuring the viewing angle characteristic are shown in FIG. 18. Likewise, the results are shown in FIG. 19 from measuring the viewing angle characteristic in the cases of the optimum combinations in embodiments 1-b and 1-c.

EMBODIMENT 5

An embodiment 5 is described below with reference to FIGS. 20 and 21.

Figure 20:
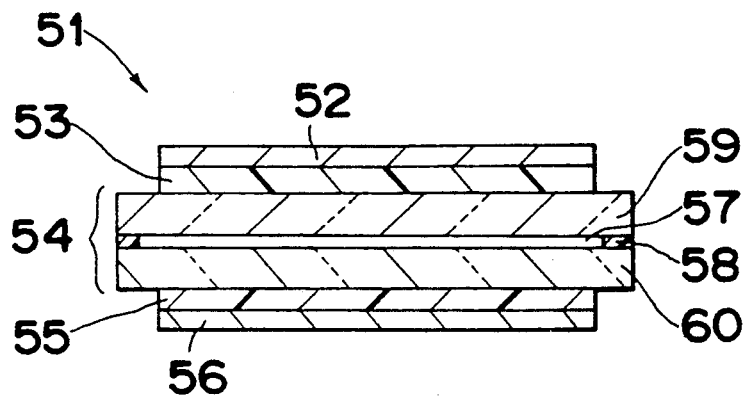
FIG. 20 is a sectional view illustrating the arrangement of liquid crystal display 1 for the explanation of embodiments of the invention.

FIG. 20 is a sectional view showing the construction of the embodiment of the present invention described below. A supertwist type liquid crystal display 51 is so constructed that a first polarizing plate 52, first phase difference plate 53, supertwist type liquid crystal cell 54, second phase difference plate 55, and second polarizing plate 56 are piled up and disposed in this order. The liquid crystal display 51 is of a negative transmission type which produces white-colored display by passing light therethrough, for example, when an on-voltage of selective waveform is applied. The first polarizing plate 2 is composed of a neutral gray type polarizing plate having a simple substance transmittance of 42% and the degree of polarization of 99.99%. The first phase difference plate 53 used is a phase difference plate composed of a large-in-wavelength-dispersion uniaxial oriented polymer film, having a thickness of 50 μm and a retardation value of 400 to 440 nm. Further, as the supertwist type liquid crystal display 54, such a panel is employed as liquid crystal 57 added with a levorotatory chiral dopant is sealed in between a pair of transmittable substrates 59 and 60 with a seal material 58 interposed on the peripheries, the panel having the settings a twist angle of 240° and a retardation value dΔn (d: thickness of liquid crystal layer, Δn: value of refractive index anisotropy of the liquid crystal) of 0.92 μm.

The inner surface of the transmittable substrates 59 and 60 facing the liquid crystal has thereon transparent electrodes, to which on- and off-voltages are applied, by means of a transparent electrically conductive film such as ITO film, while on the overall surface is formed a film composed of, for example, an inorganic film such as an $SiO_2$ film or a polyimide-related polymer film, so as to cover the transparent electrodes, where orientation treatment is made by rubbing with a cloth or the like, thus forming a orientation film having a rubbing axis. The second phase difference plate 55 is of a type having the same retardation value as that of the first phase difference plate 53, while the second polarizing plate 56 is of the same type as the first polarizing plate 52.

The disposing location for piling up the above component members is described below with reference to FIG. 21.

Figure 21:
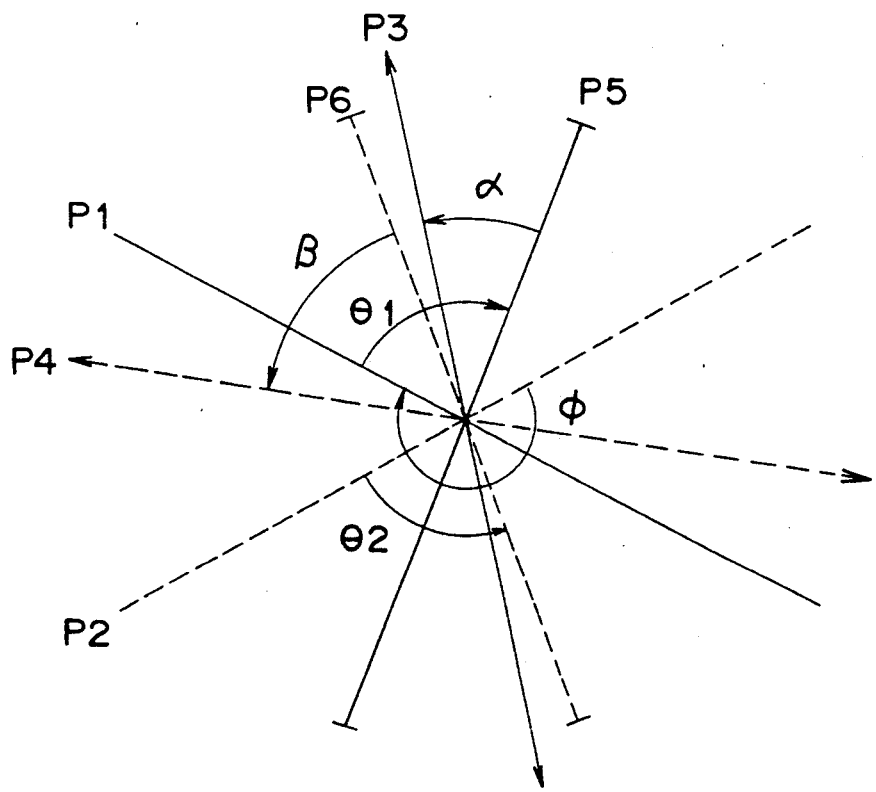
FIG. 21 is a figure showing the disposing location of component members of the present embodiments.

Out of the arrows shown in FIG. 21, an arrow P1 shows the liquid crystal molecular orientation axis (first rubbing axis) of the one transmittable substrate 59 composing the supertwist type liquid crystal cell 54, an arrow P2 shows the liquid crystal molecular orientation axis (second rubbing axis) of the other transmittable substrate 60, an arrow P3 shows the absorbing axis of the first polarizing plate 52, an arrow P4 shows the absorbing axis of the second polarizing plate 56, an arrow P5 shows the slow axis of the first phase difference plate 53, and an arrow P6 shows the slow axis of the second phase difference plate 55. Further an angle $\theta1$ represents a cross angle formed between the slow axis P5 of the first phase difference plate 53 and the liquid crystal molecular orientation axis P1 of the one transmittable substrate 59 adjacent thereto (hereinafter, at times referred to as "disposition angle of the first phase difference plate 53"), an angle $\theta2$ represents a cross angle formed between the slow axis P6 of the second phase difference plate 55 and the liquid crystal molecular orientation axis P2 of the other transmittable substrate 60 adjacent thereto (hereinafter, at times referred to as "disposition angle of the second phase difference plate 55"). Finally, an angle $\alpha$ represents a cross angle formed between the absorbing axis P3 of the first polarizing plate 52 and the slow axis P5 of the first phase difference plate 53 (hereinafter, at times referred to as "disposition angle of the first polarizing plate 52"), an angle $\beta$ represents a cross angle formed between the absorbing axis P4 of the second polarizing plate 56 and the slow axis P6 of the second phase difference plate 55 (hereinafter, at times referred to as "disposition angle of the second polarizing plate 56"), and an angle $\phi$ represents a liquid crystal twist angle.

Figure 22:
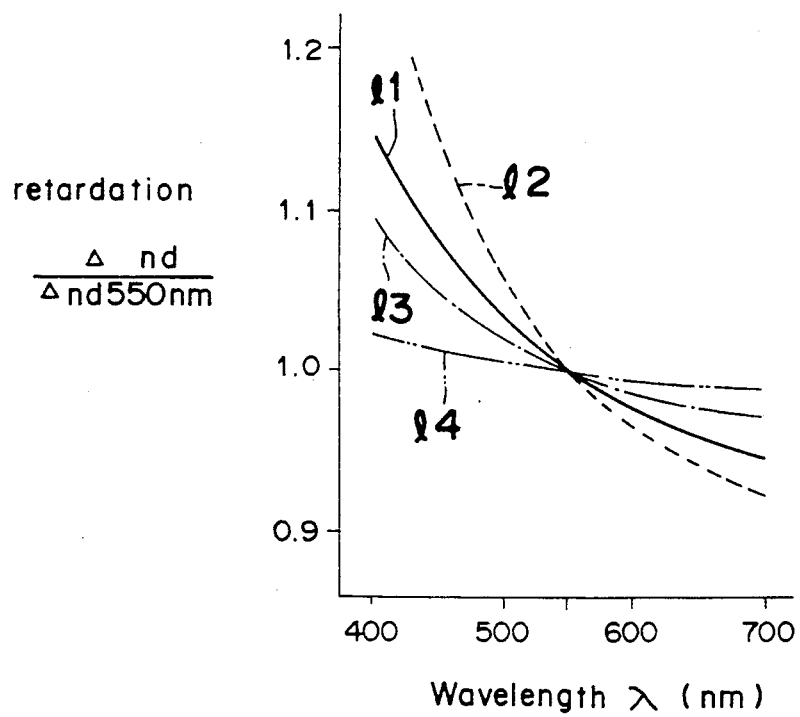
FIG. 22 is a figure showing an exemplary wavelength dispersion of retardation values in various types of phase difference plates.

FIG. 22 shows some cases of wavelength dispersion of retardation in the first and second phase difference plate 53 and 55 made from various materials of uniaxial oriented polymer films. In the figure, a continuous line 11 shows the case of polycarbonate (PC), a broken line 12 that of polyether sulfon (PES), and a dashed line 13 that of polymethyl methacrylate (PMMA), wherein the materials mentioned above are of a greater wavelength dispersion of retardation. On the other hand, a two-dot chain line 14 shows the case of polyvinyl alcohol (PVA), which is of a less wavelength dispersion of retardation as is with polypropylene. Incidentally, in FIG. 22, the retardation value d$\Delta$n 550 nm is normalized to 1.0 for each of the materials.

Figure 23:
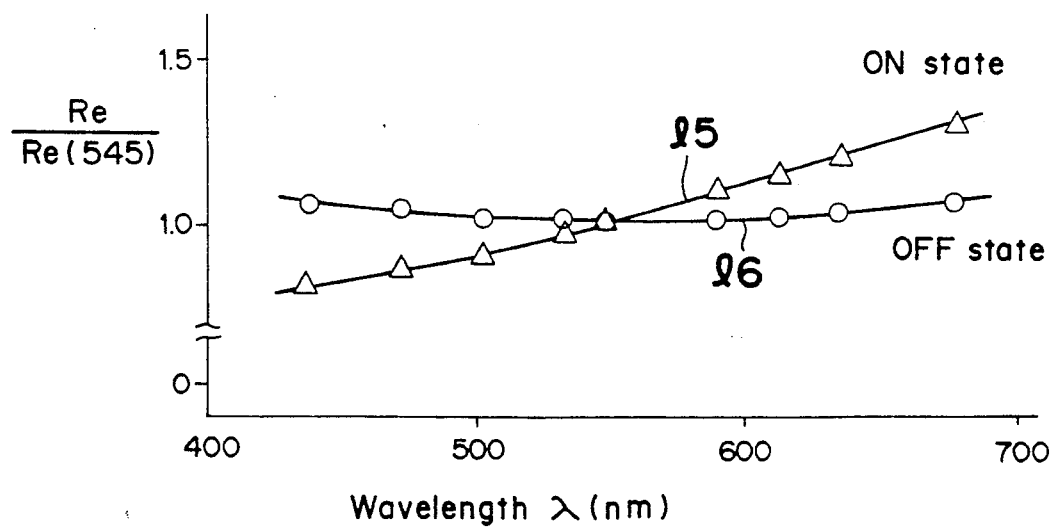
FIG. 23 is a figure showing the wavelength dispersion of retardation values at the on/off states of liquid crystal display cell 4.

FIG. 23 illustrates the wavelength dispersion of retardation of the liquid crystal cell 54. In the figure, a continuous line 15 shows the wavelength dispersion of retardation values of the liquid crystal cell with an on-voltage applied, and a continuous line 16 shows the same with an off-voltage applied. FIG. 23 is attained in such a way that, using a homogeneous oriented liquid crystal cell, the wavelength dispersion thereof is determined and further the optical rotatory dispersion thereof is approximated from the optical rotation angle of a twisted liquid crystal cell, and the obtained wavelength dispersions are synthesized with the wavelength dispersion above described, wherein the retardation value of 545 nm is normalized to 1.0.

Now considerations are directed to the retardation occurring when phase difference plates and a liquid crystal cell having the wavelength dispersions referred to in FIGS. 22 and 23, respectively, are piled on each other. The phase difference plates in this case are disposed so as to phase-subtractingly effect the retardation of the liquid crystal cell. To precision this, such an arrangement, where phase difference plates are disposed so as to phase-subtractingly effect the retardation of a liquid crystal cell, means that phase difference plates are disposed so as to direct the slow axis of the phase difference plate perpendicular to the rubbing axis of the liquid crystal cell adjacent thereto.

Figure 24:
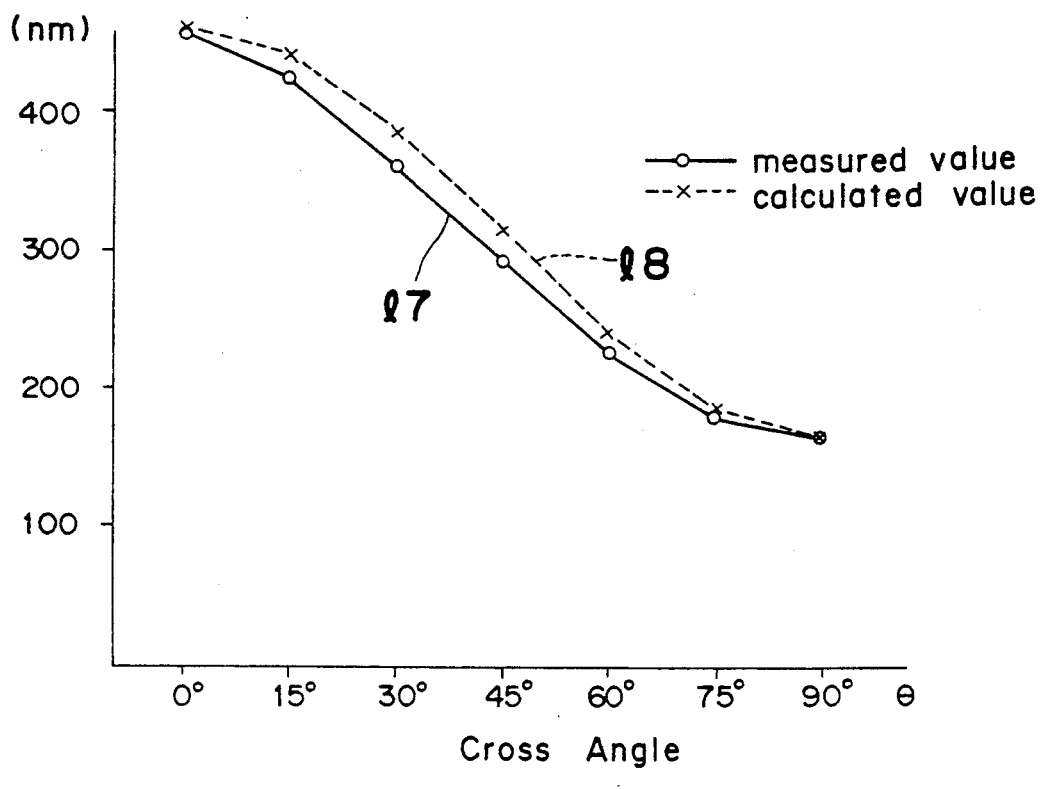
FIG. 24 is a figure showing the relationship between the crossed axes angle $\theta$ between two phase difference plates and the retardation value Re (total) in their measured and calculated values.

Meanwhile, when phase difference plates differing in their retardation values are piled up at a cross angle $\theta$ between the slow axes (or fast axes) thereof, the effective retardation value will have a relationship such as shown in FIG. 24. In the figure, a continuous line 17 indicated by circles ○ shows measured values, while a broken line 18 indicated by X marks shows calculated values on the assumption that:

$$Re\ (total) = Re1 + Re2 \cdot \cos2\theta \qquad (1)$$

$$(provided\ Re1 > Re2)$$

where,

Re1: retardation value of one phase difference plate = 461 nm,

Re2: retardation value of the other phase difference plate = 163 nm.

From FIG. 24, it is understood that the measured values and the above calculated values approximately coincide with each other. Therefore, through the calculation using the above calculation equation, the effective retardation values can be determined in the case where the relationship between two phase difference plates is substituted by that between a phase difference plate and a liquid crystal cell. Further the cross angle between the aforementioned phase difference plate and the liquid crystal cell is varied.

Then, in the negative transmission type liquid crystal display 51 having such a piling-up construction as shown in FIG. 20, the retardation values of the first phase difference plate 53 and the second phase difference plate 55 are set to the same one and the phase difference plates are disposed symmetrically with respect to the liquid crystal cell 54. That is, the disposition angle $\theta1$ of the first phase difference plate 53 and the disposition angle $\theta2$ of the second phase difference plate 55 are set to:

$$\theta1 = \theta2 \qquad (2)$$

Figure 25:
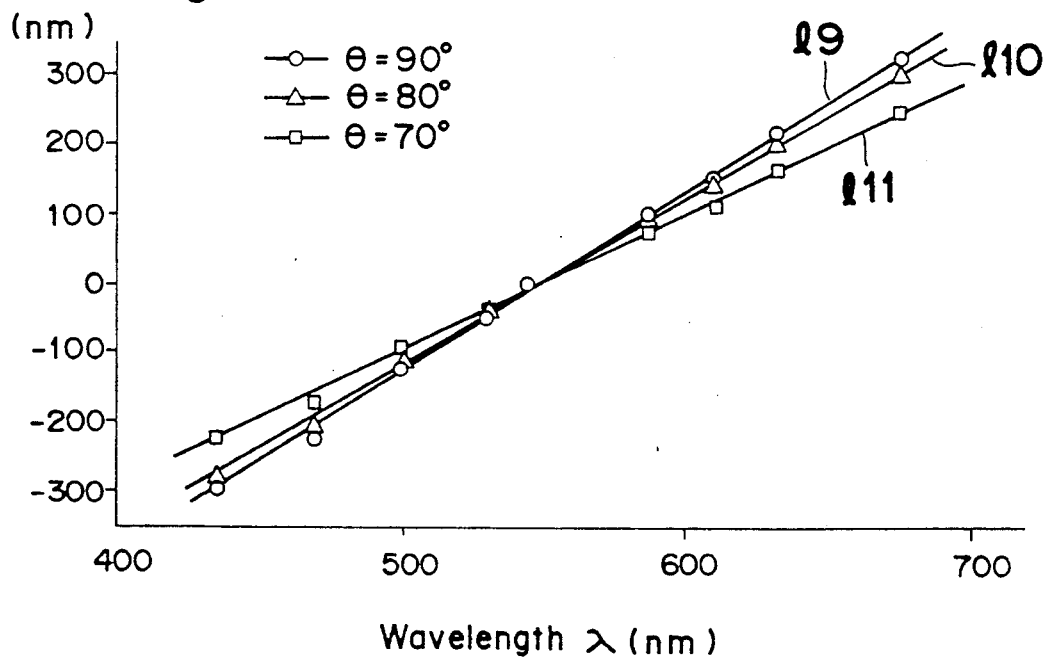
FIG. 25 is a figure showing the qualitative tendency of wavelength dispersion when the cross angles $\theta 1$, $\theta 2$ between the first and second phase difference plates 53, 55 and the liquid crystal display cell 54 are 90°, 80°, and 70°.

In this arrangement, we looked into the qualitative tendency of effective retardation values with the disposition angles $\theta1$ and $\theta2$ varied as 90° (shown by the continuous line 19 in FIG. 25), 80° (shown by the continuous line 110 in FIG. 25), 70° (shown by the continuous line 111 in FIG. 25), and so forth. In this case, the wavelength dispersion of effective retardation values may be regarded as the wavelength dispersion of retardation values of the finally emitted light. Incidentally, the calculated values in FIG. 25 are based on the assumption that the retardation value becomes 0 for a wavelength $\lambda$ of 545 nm, and not a qualitative value. From FIG. 25, it is found that there is a tendency that the less the disposition angles $\theta1$ and $\theta2$ of the phase difference plates 53 and 55, the less the wavelength dispersion of the retardation value of the finally emitted light.

Figure 26:
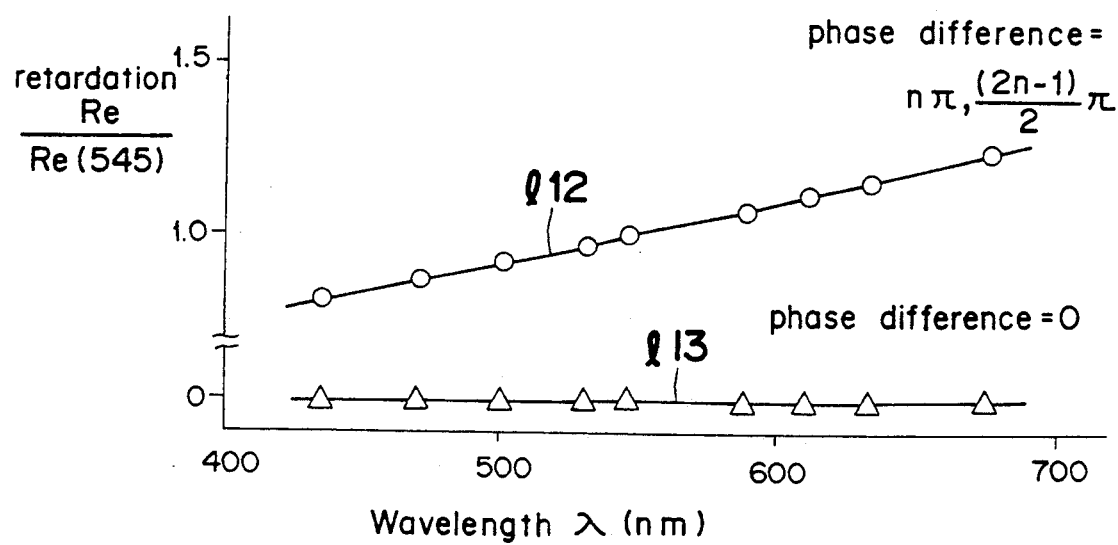
FIG. 26 is a figure showing the wavelength dispersion of an ideal retardation value.

Referring to the state of the emitted light for obtaining black-and-white displays, the phase difference should only be 0 or $n\pi$ (n:integer) when an off-voltage of ideally non-selective waveform is applied, and should be $(2n-1)\pi/2$ (n:integer) when an on-voltage of selective waveform is applied. The transmitting light becomes a linearly polarized light when the phase difference is 0 or $n\pi$, while it becomes an elliptically polarized light when the phase difference is $(2n-1)\pi/2$. The wavelength dispersion in such that an ideal condition results in the one as shown by continuous lines 112 and 113 in FIG. 26. Accordingly, if the wavelength dispersion is approximated to the ideal one shown in FIG. 26 by combining the wavelength dispersion of the liquid crystal cell with that of a phase difference plate, a perfect black-and-white display can be obtained. This means that, due to the tendency of wavelength dispersion as shown in FIG. 25, the further the disposition angles $\theta1$ and $\theta2$ of the phase difference plates 53 and 55 decrease, the closer the wavelength dispersion is to an ideal one with an on-voltage applied, hence an increased whiteness level.

To verify the above results, we then reviewed the spectral transmittance with an on-voltage applied in the individual disposing conditions (see FIG. 27) and the CIE chromaticity coordinates (see FIG. 28), with the angles $\theta1$, $\theta2$, $\alpha$ and $\beta$ set in various kinds as shown in Table 1, taking a case of a negative transmission type liquid crystal display having a piling-up construction such as shown in FIG. 20, wherein the retardation values of the first phase difference plate 53 and the second phase difference plate 55 is of a kind and the phase difference plates are disposed symmetrically with respect to the liquid crystal cell 54.

TABLE 1

|   | $\theta1$ | $\theta2$ | $\alpha$ | $\beta$ |
|---|---|---|---|---|
| 1 | 65° | 65° | 30° | 60° |
| 2 | 70° | 70° | 30° | 60° |
| 3 | 75° | 75° | 30° | 60° |
| 4 | 80° | 80° | 30° | 60° |
| 5 | 85° | 85° | 30° | 60° |

TABLE 2

|   | $\theta1$ | $\theta2$ | $\alpha$ | $\beta$ |
|---|---|---|---|---|
| 6 | 70° | 65° | 30° | 60° |
| 7 | 75° | 70° | 30° | 60° |
| 8 | 80° | 75° | 30° | 60° |
| 9 | 85° | 80° | 30° | 60° |

Figure 27:
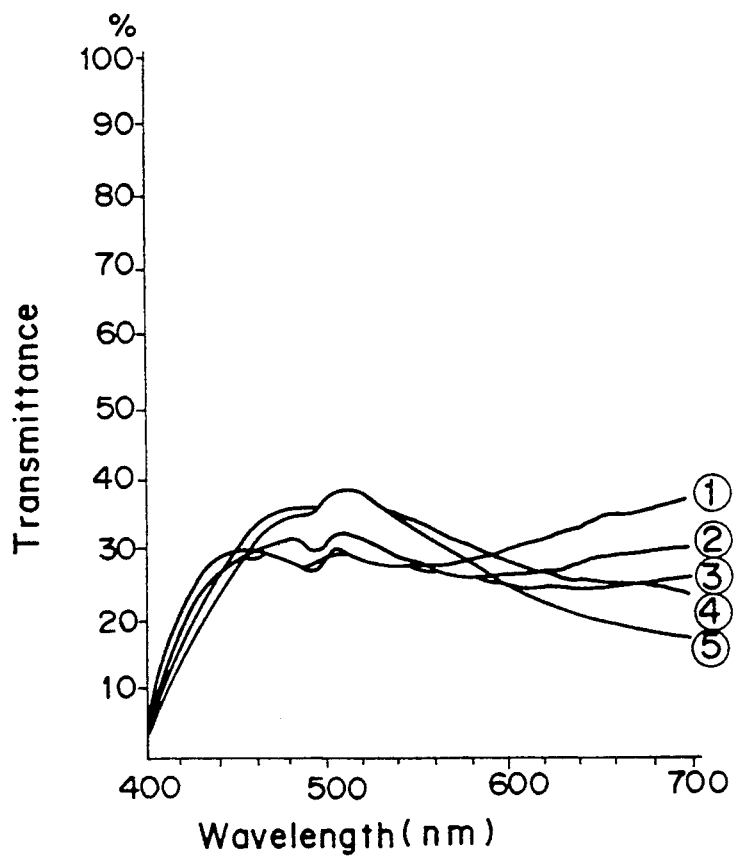
FIG. 27 is a figure showing the relationship between disposition angles θ1, θ2 of the phase difference plates 53, 55 and the spectral transmittance factor under the condition that the phase difference plates are disposed symmetrically with respect to the liquid crystal display cell 54.
Figure 28:
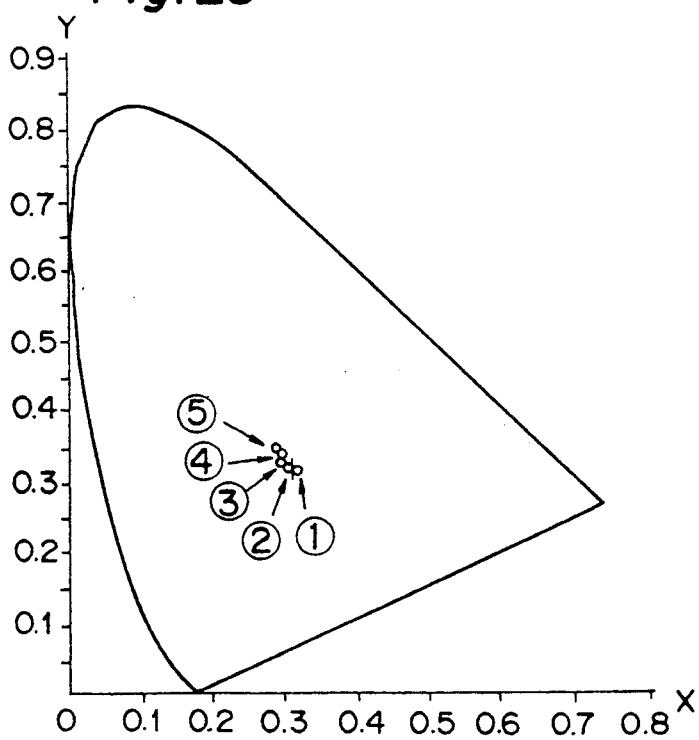
FIG. 28 is a figure showing the positions on the CIE chromaticity coordinates under the disposition conditions of FIG. 27.

As understood from FIGS. 27 and 28, the smaller the disposition angles $\theta1$ and $\theta2$, the higher the contrast and the white portions on the display device tends to be displayed whiter.

The above tendency can be acknowledged as shown in the Table 2 in the case where the phase difference plates 53 and 55 are disposed asymmetrically in such a manner that the disposition angle $\theta2$ of the second phase difference plate 55 is smaller 5° than the disposition angle $\theta1$ of the first phase difference plate 53.

Figure 29:
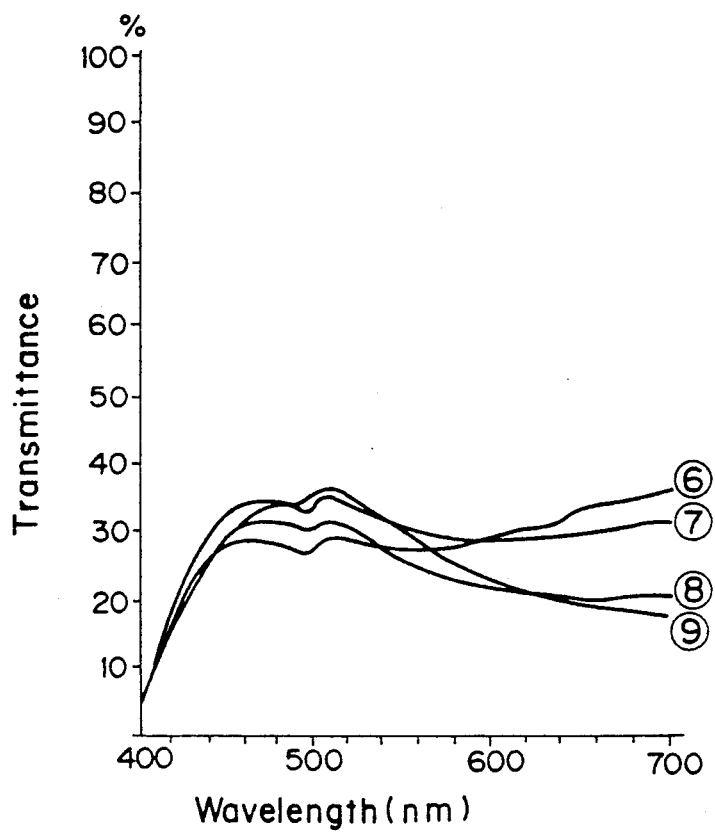
FIG. 29 is a figure showing the relationship between disposition angles θ1, θ2 of the phase difference plates 53, 55 and the spectral transmittance under the disposition condition that the phase difference plates are disposed asymmetrically with respect to the liquid crystal display cell 54 by a difference of 5°.
Figure 30:
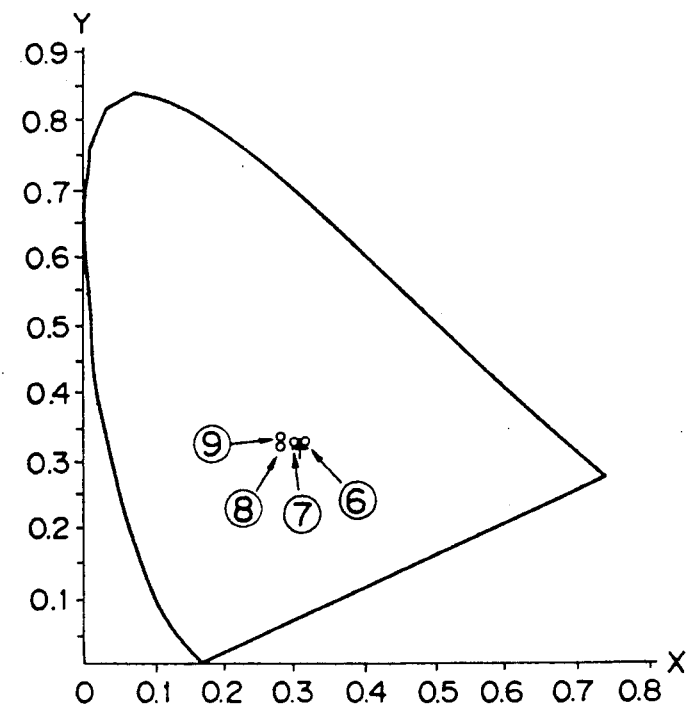
FIG. 30 is a figure showing the positions on the CIE chromaticity coordinates under the disposition conditions of FIG. 29.

Namely, it can be understood from FIG. 29 showing the spectral transmittance under the on voltage application that the smaller the disposition angles $\theta1$ and $\theta2$, the higher the contrast and thus the white portion on the display device can be whiter, when the disposition angles $\theta1$ and $\theta2$ are smaller than the CIE chromaticity co-ordinate as shown in FIG. 30.

Figure 31:
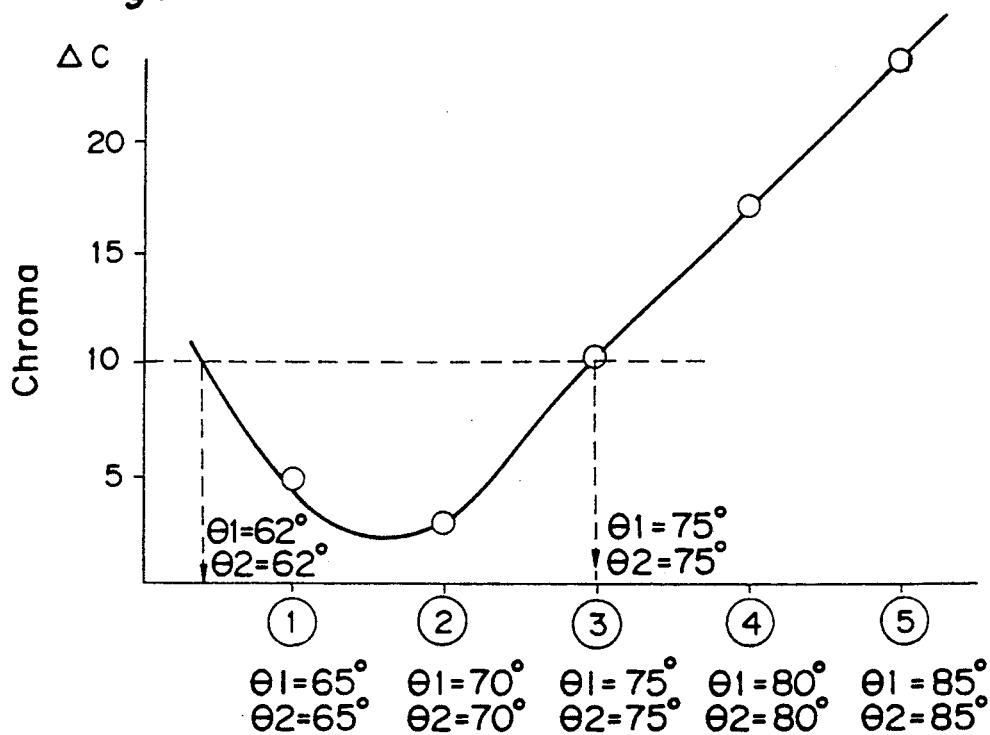
FIG. 31 is a figure showing the relationship between disposition angles θ1, θ2 of the phase difference plates 53, 55 and chroma ΔC with an on-voltage applied under the same condition as in FIG. 27.
Figure 32:
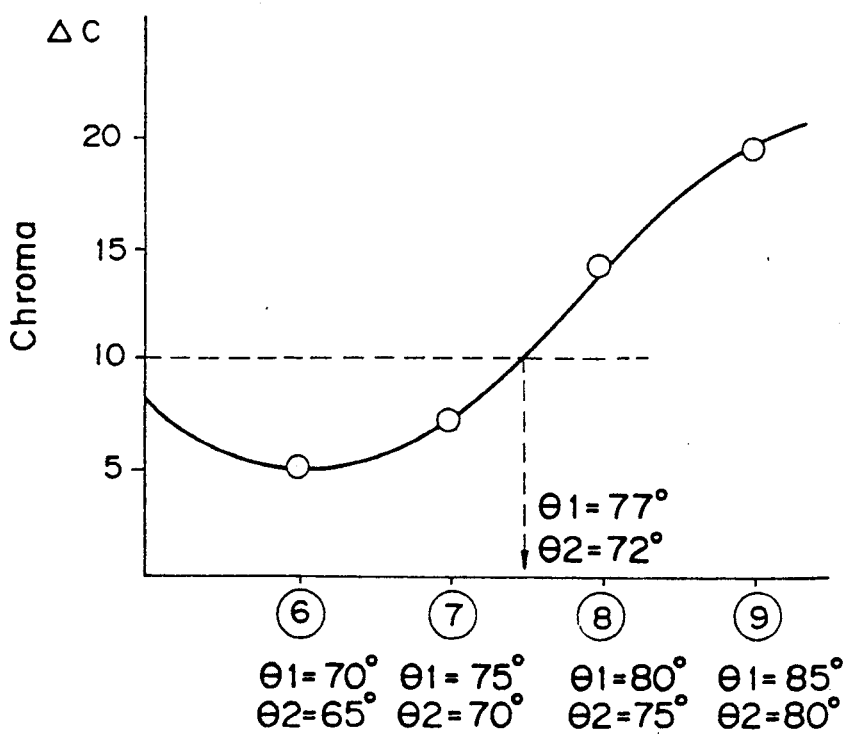
FIG. 32 is a figure showing the relationship between disposition angles θ1, θ2 of the phase difference plates 53, 55 and chroma ΔC with an on-voltage applied under the same condition as in FIG. 29.

From the tendency mentioned above, in order to examine the disposition condition of the phase difference plates in detail to obtain a higher contrast and a better color correction, the parameters $\Delta u$ and $\Delta v$ of the CIELUV chromaticity coordinate under application of on voltage for making the contrast maximum on were measured and the chroma $\Delta C = \sqrt{\Delta u^2 + \Delta v^2}$ was calculated so as to evaluate the whiteness level. The result of the evaluation is shown in FIGS. 31 and 32. In FIG. 31 the chroma $\Delta C$ is shown in the case where the phase difference plates 53 and 55 are disposed symmetrical to the liquid crystal cell 54 using the disposition angles $\theta1$ and $\theta2$ as the parameters under the disposition condition shown in the Table 1. The phase different plates 53 and 55 are made of uniaxial oriented polycarbonate polymer film. In FIG. 32 the chroma $\Delta C$ is shown in the case where the phase difference plates 53 and 55 made of uniaxial oriented polycarbonate polymer film are disposed asymmetrical to the liquid crystal cell 54 using the disposition angles $\theta1$ and $\theta2$ as the parameters under the disposition condition shown in the Table 2.

It is noted that the chroma shown in FIGS. 31 and 32 is the chroma when the on voltage is applied. However, as the liquid crystal display device, even if the whiteness level under the application of the on voltage is good, sometimes the contrast is deteriorated. Therefore, it is necessary to obtain good balance between the whiteness level and the contrast on the display in the liquid crystal display device. Therefore, the contrast is evaluated for the various disposition conditions having good whiteness level which are selected from FIGS. 31 and 32 by changing the disposition angles $\alpha$ and $\beta$ of the first polarizing plate 52 and the second polarizing plate 56.

Figure 33:
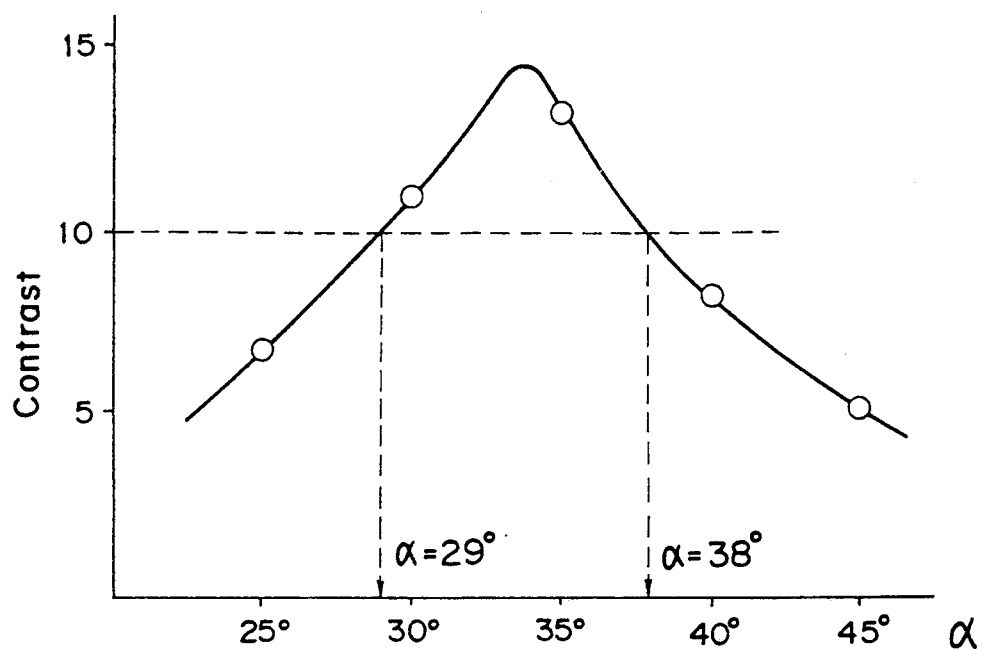
FIG. 33 is a figure showing the relationship between the disposition angle of the first polarizing plate 2 and the contrast when θ1=75°, θ2=70°, and β=60°.
Figure 34:
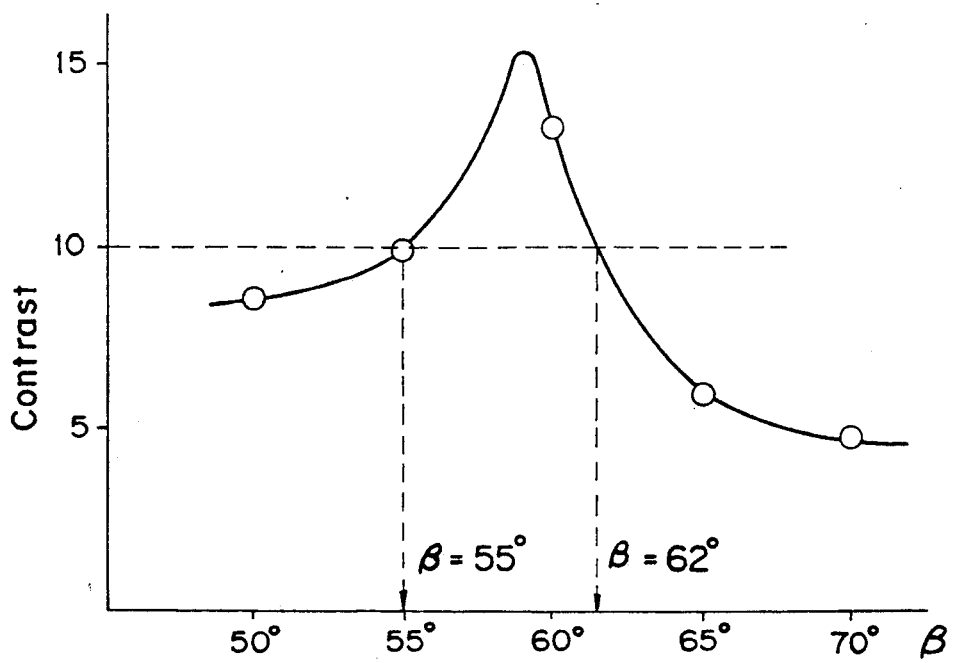
FIG. 34 is a figure showing the relationship between the disposition angle β of the second polarizing plate 6 and the contrast when θ1=75°, θ2=70°, and α=35°.

In the present embodiment, the contrast change is sought for the case, which shows a comparatively good balance between the contrast and the whiteness level, that the disposition angle $\theta1$ of the first phase difference plate 53 is 75° and the disposition angle $\theta2$ of the second phase difference plate 55 is 70° by changing the disposition angles $\alpha$ and $\beta$ of the first and second polarizing plates 52 and 56. The result is shown in FIGS. 33 and 34. FIG. 33 shows the result of the contrast change under such condition that the disposition angle $\alpha$ of the first polarizing plate 52 is changed with the disposition angle $\beta$ of the second polarizing plate 56 is fixed at 60°. In FIG. 34, the result is shown when the disposition angle $\alpha$ of the first polarizing plate 52 is fixed at 30° with the disposition angle $\beta$ of the second polarizing plate 56 changed.

Referring to FIGS. 31 to 34, assuming that the necessary conditions for the whiteness level and the contrast for the practical liquid crystal display device are the chroma $\Delta C \leq 10$
the contrast $CO \geq 10$,
when
$62° \leq \theta1 \leq 77°$
$62° \leq \theta2 \leq 77°$
$29° \leq \alpha \leq 38°$
$55° \leq \beta \leq 62°$ are satisfied, the balance of the clear whiteness level and high contrast can be assured.

Moreover, among the various disposition conditions, there are examined such disposition conditions that the disposition angle $\theta2$ of the second phase difference plate 55 is smaller by 5° than the disposition angle $\theta1$, of the first phase difference plate 53 for example, $\theta2$ is set at 70° and $\theta1$ is set at 75° and the disposition angle $\alpha$ of the first polarizing plate 52 is set at 35° with the disposition angle $\beta$ of the second polarizing plate 56 set at 60°.

Namely, when the respective angles $\theta1$, $\theta2$, $\alpha$, $\beta$ satisfy the equations 5 to 8 and $$\theta1 = \theta2 + 5° \tag{9}$$

$$\theta1 - \alpha = \theta2 + \beta - 90° \tag{10}$$

are satisfied, in other words, when the absorbing axis of one of the polarizing plates 52 and 56 and the transmitting axis (vertical to the absorbing axis) of an other polarizing plate are disposed symmetrical in terms of the liquid crystal 54, there can be obtained the best whiteness level and the highest contrast.

The various disposition conditions were evaluated by the following examples 5-a to 5-f having disposition conditions contained in the above mentioned disposition conditions by comparing with the comparative examples 5-1 and 5-2 of which disposition conditions were not contained in the above mentioned disposition conditions.

It is noted that the examples 5-a to 5-f are only examples of the disposition conditions according to the present invention.

EXAMPLE 5-a

As the first phase difference plate 53 and the second phase difference plate 55, there were used the phase difference plate having the retardation value 420 nm (nano meters), while as the liquid crystal cell 54, there was used the liquid crystal cell having the retardation value $d\Delta n = 0.92$ μm, twisted angle = 240°. The respective components were disposed with the disposition angles $\theta 1 = 65°$, $\theta 2\ 65°$, $\alpha = 30°$ and $\beta = 60°$.

Figure 35:
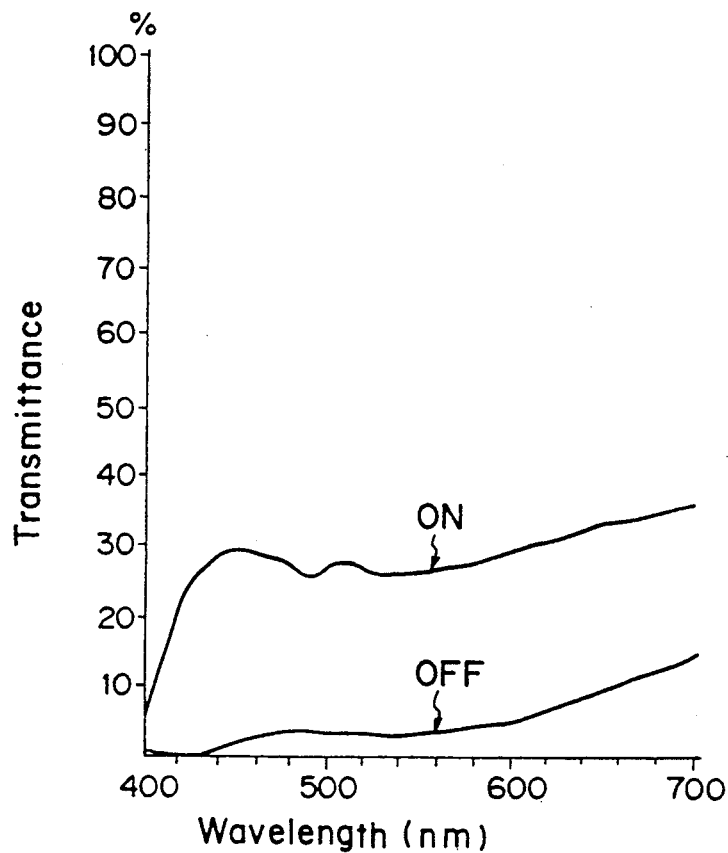
FIG. 35 is a figure showing the spectral transmittance with the on/off voltage applied in embodiment 5-a.
Figure 36:
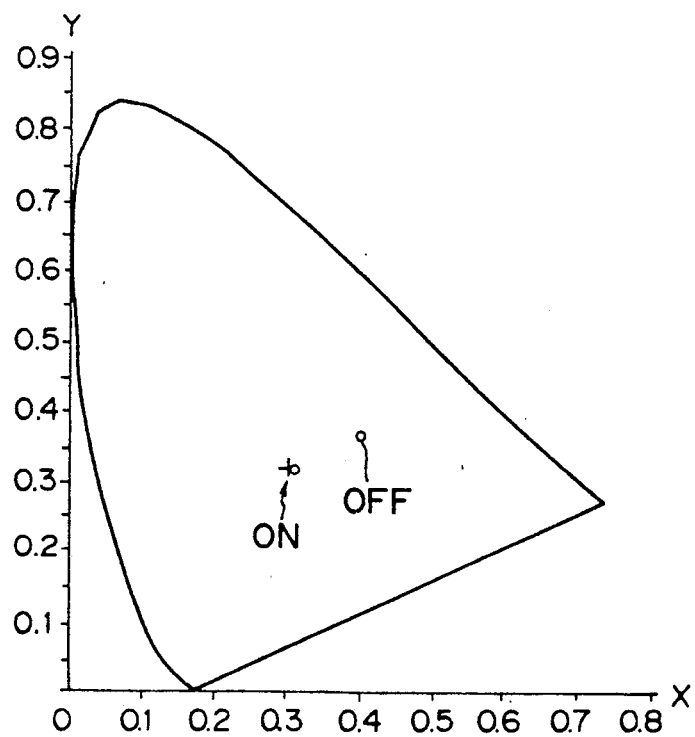
FIG. 36 is a figure showing the positions on the CIE chromaticity coordinates with the on/off voltage applied in embodiment 5-a.

FIG. 35 shows the spectral transmittance when such a voltage that makes the contrast highest is applied with the 1/240 duty, 1/13 bias drive. CIE chromaticity coordinate under the above conditions is shown in FIG. 36.

The chroma $\Delta C$ was 4.79 and the contrast was 10.

EXAMPLE 5-b

As the first phase difference plate 53 and the second phase difference plate 55, there were used the phase difference plate having the retardation value 420 nm (nano meters), while as the liquid crystal cell 54, there was used the liquid crystal cell having the retardation value $\Delta an = 0.92$ μm, twisted angle = 240°. The respective components were disposed with the disposition angles $\theta 1 = 70°$, $\theta 2 = 65°$, $\alpha = 30°$ and $\beta = 60°$.

Figure 37:
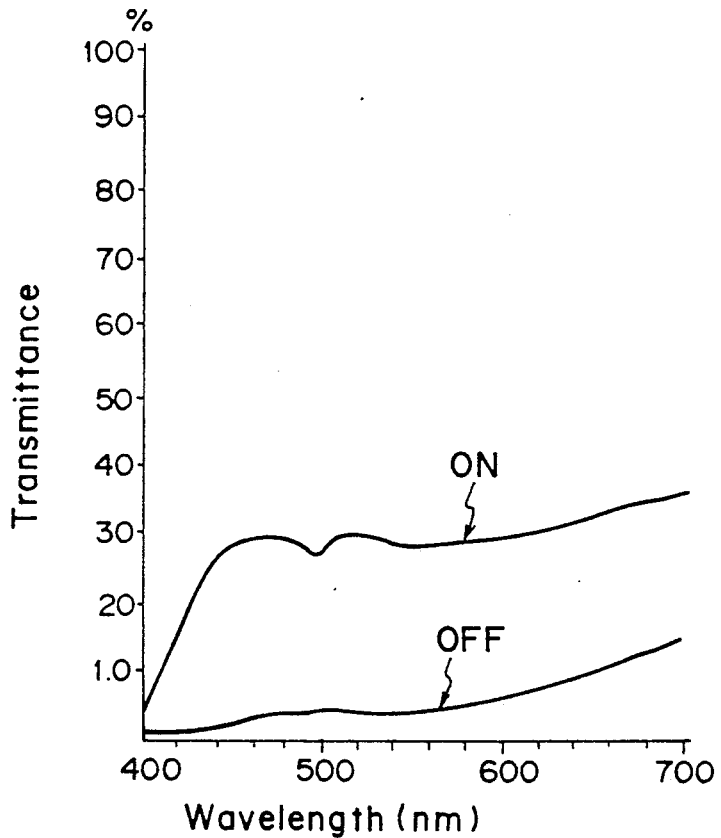
FIG. 37 is a figure showing the spectral transmittance with the on/off voltage applied in embodiment 5-b.
Figure 38:
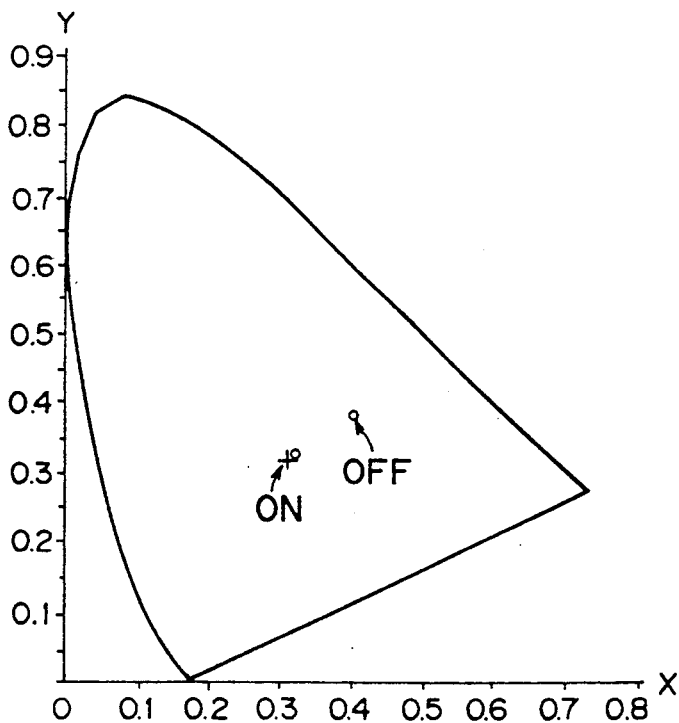
FIG. 38 is a figure showing the positions on the CIE chromaticity coordinates with the on/off voltage applied in embodiment 5-b.

FIG. 37 shows the spectral transmittance when such a voltage that makes the contrast highest is applied with the 1/240 duty, 1/13 bias drive. CIE chromaticity coordinate under the above conditions is shown in FIG. 38.

The chroma $\Delta C$ was 5.04 and the contrast was 11.

EXAMPLE 5-c

As the first phase difference plate 53 and the second phase difference plate 55, there were used the phase difference plate having the retardation value 420 nm (nano meters), while as the liquid crystal cell 54, there was used the liquid crystal cell having the retardation value $d\Delta n = 0.92$ μm, twisted angle = 240°. The respective components were disposed with the disposition angles $\theta 1 = 70°$, $\theta 2 = 70°$, $\alpha = 30°$ and $\beta = 60°$.

Figure 39:
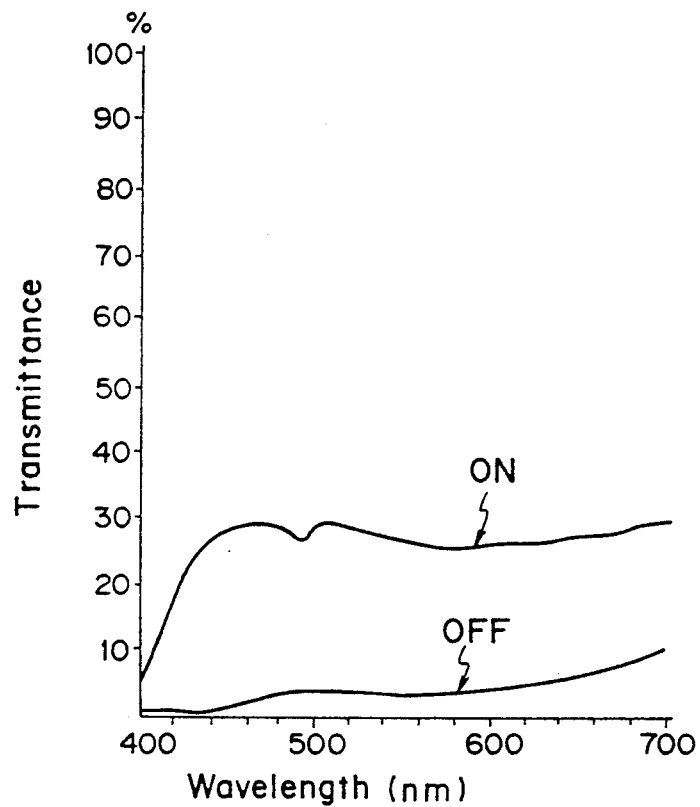
FIG. 39 is a figure showing the spectral transmittance with the on/off voltage applied in embodiment 5-c.
Figure 40:
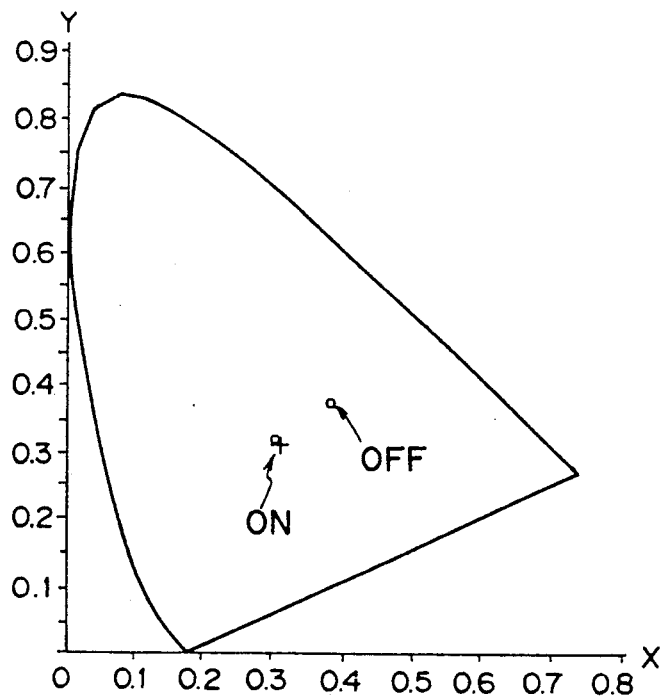
FIG. 40 is a figure showing the positions on the CIE chromaticity coordinates with the on/off voltage applied in embodiment 5-c.

FIG. 39 shows the spectral transmittance when such a voltage that makes the contrast highest is applied with the 1/240 duty, 1/13 bias drive. CIE chromaticity coordinate under the above conditions is shown in FIG. 40.

The chroma $\Delta C$ was 2.86 and the contrast was 12.

EXAMPLE 5-d

As the first phase difference plate 53 and the second phase difference plate 55, there were used the phase difference plate having the retardation value 420 nm (nano meters), while as the liquid crystal cell 54, there was used the liquid crystal cell having the retardation value $d\Delta n = 0.92$ μm, twisted angle = 240°. The respective components were disposed with the disposition angles $\theta 1 = 75°$, $\theta 2 = 70°$, $\alpha = 35°$ and $\beta = 60°$.

Figure 41:
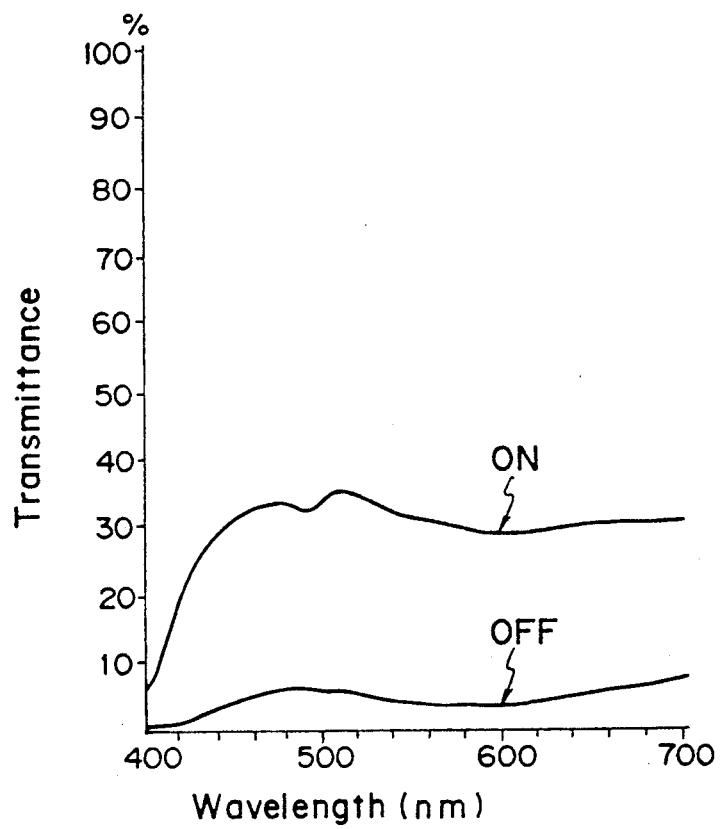
FIG. 41 is a figure showing the spectral transmittance with the on/off voltage applied in embodiment 5-d.
Figure 42:
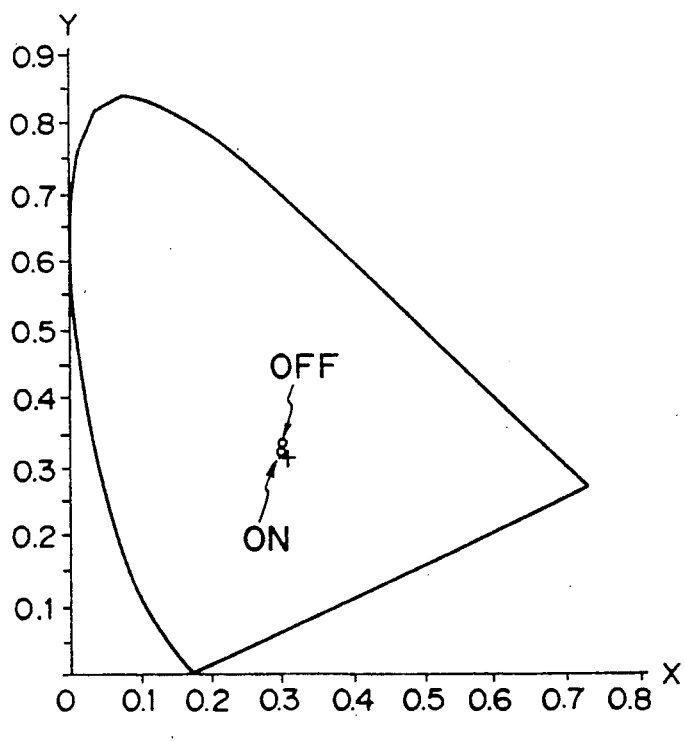
FIG. 42 is a figure showing the positions on the CIE chromaticity coordinates with the on/off voltage applied in embodiment 5-d.

FIG. 41 shows the spectral transmittance when such a voltage that makes the contrast highest is applied with the 1/240 duty, 1/13 bias drive. CIE color co-ordinate under the above conditions is shown in FIG. 42.

The chroma $\Delta C$ was 5.69 and the contrast was 13.

EXAMPLE 5-e

As the first phase difference plate 53 and the second phase difference plate 55, there were used the phase difference plate having the retardation value 420 nm (nano meters), while as the liquid crystal cell 54, there was used the liquid crystal cell having the retardation value $d\Delta n = 0.92$ μm, twisted angle = 240°. The respective components were disposed with the disposition angles $\theta 1 = 75°$, $\theta 2 = 70°$, $\alpha = 30°$ and $\beta = 60°$.

Figure 43:
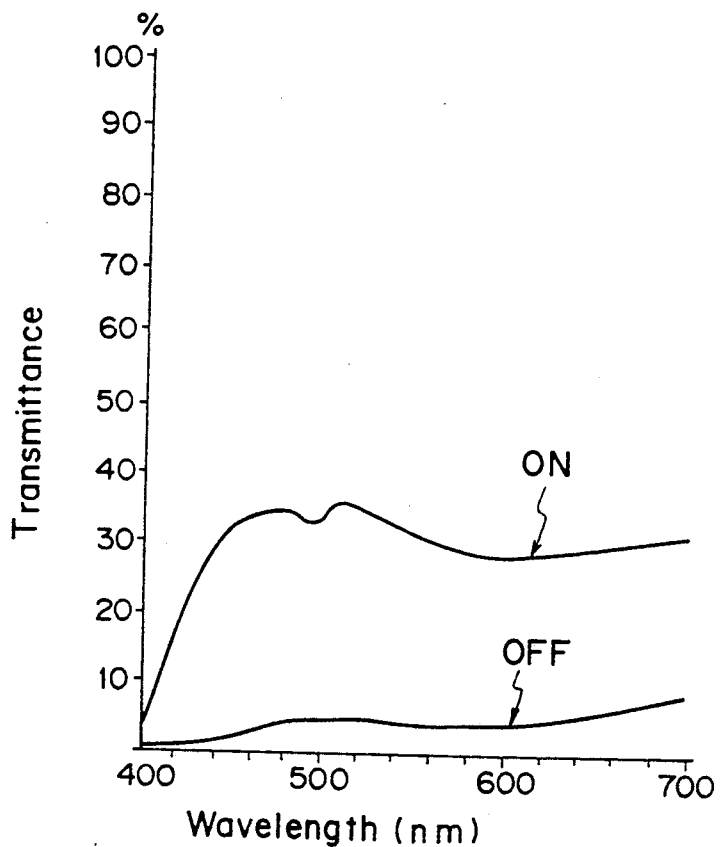
FIG. 43 is a figure showing the spectral transmittance with the on/off voltage applied in embodiment 5-e.
Figure 44:
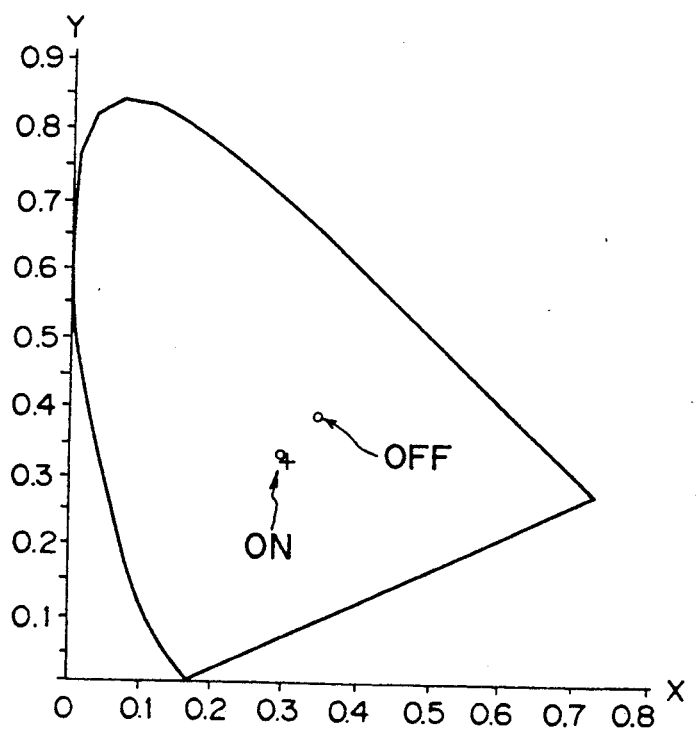
FIG. 44 is a figure showing the positions on the CIE chromaticity coordinates with the on/off voltage applied in embodiment 5-e.

FIG. 43 shows the spectral transmittance when such a voltage that makes the contrast highest is applied with the 1/240 duty, 1/13 bias drive. CIE chromaticity co-ordinate under the above conditions is shown in FIG. 44.

The chroma $\Delta C$ was 7.17 and the contrast was 11.

EXAMPLE 5-f

As the first phase difference plate 53, there was used the phase difference plate having the retardation value 400 nm (nano meters), and as the second phase difference plate 55, there was used the phase difference plate having the retardation value 440 nm, while as the liquid crystal cell 54, there was used the liquid crystal cell having the retardation value $d\Delta n = 0.92$ μm, twisted angle = 240°. The respective components were disposed with the disposition angles $\theta 1 = 75°$, $\theta 2 = 70°$, $\alpha = 35°$ and $\beta = 60°$.

Figure 45:
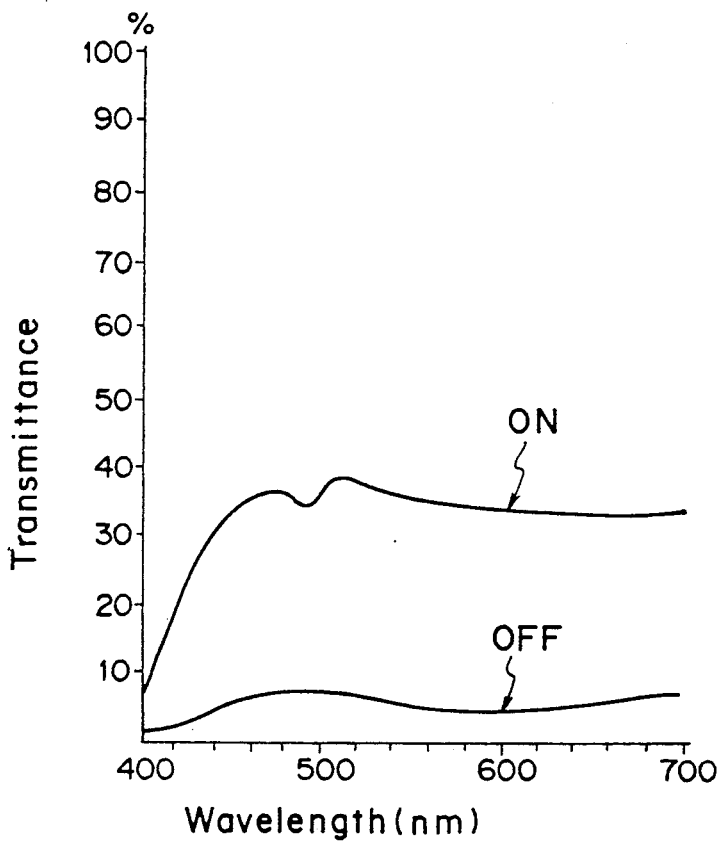
FIG. 45 is a figure showing the spectral transmittance with the on/off voltage applied in embodiment 5-f.
Figure 46:
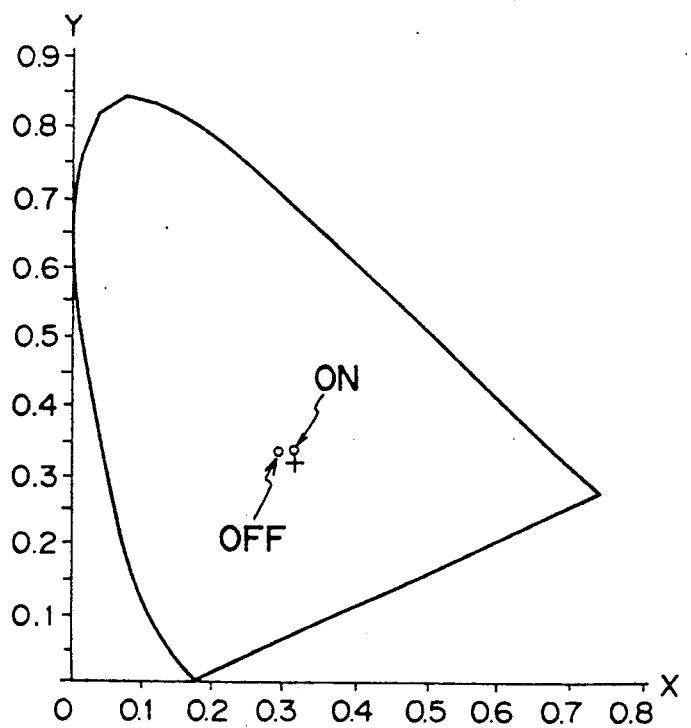
FIG. 46 is a figure showing the positions on the CIE chromaticity coordinates with the on/off voltage applied in embodiment 5-f.

FIG. 45 shows the spectral transmittance when such a voltage that makes the contrast highest is applied with the 1/240 duty, 1/13 bias drive. CIE chromaticity co-ordinate under the above conditions is shown in FIG. 46.

The chroma $\Delta C$ was 9.16 and the contrast was 13.

COMPARATIVE EXAMPLE 5-1

As the first phase difference plate 53 and the second phase difference plate 55, there were used the phase difference plate having the retardation value 420 nm (nano meters), while as the liquid crystal cell 54, there was used the liquid crystal cell having the retardation value $d\Delta n = 0.92$ μm, twisted angle = 240°. The respective components were disposed with the disposition angles $\theta 1 = 80°$, $\theta 2 = 80°$, $\alpha = 30°$ and $\beta = 60°$.

Figure 47:
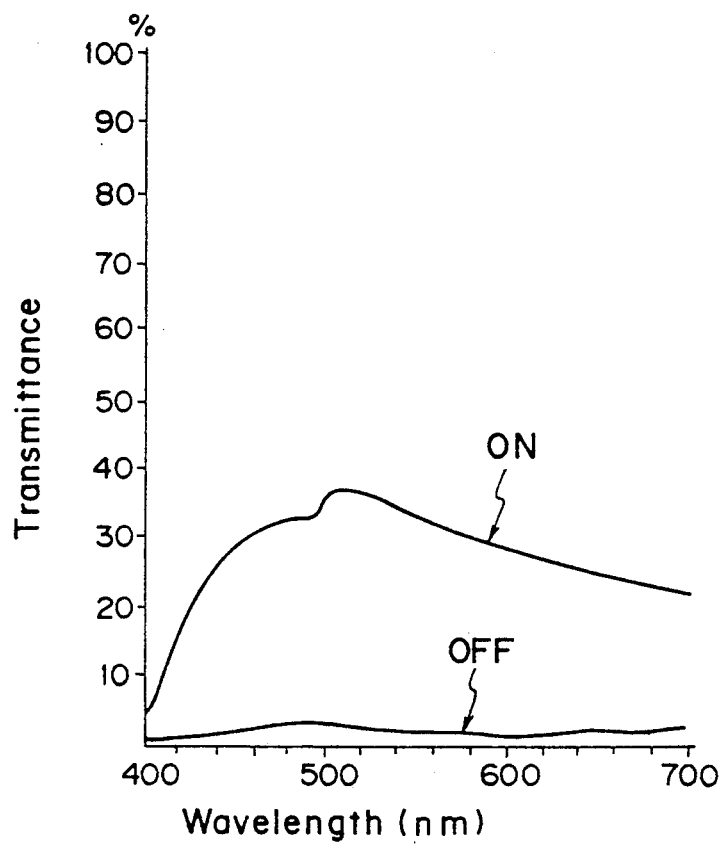
FIG. 47 is a figure showing the spectral transmittance with the on/off voltage applied in comparison embodiment 5-1.
Figure 48:
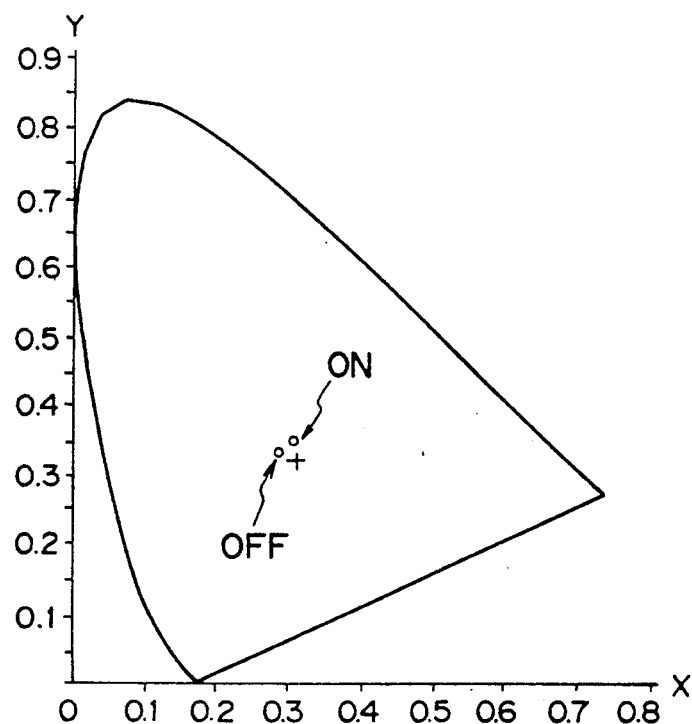
FIG. 48 is a figure showing the positions on the CIE chromaticity coordinates with the on/off voltage applied in comparison embodiment 5-1.

FIG. 47 shows the spectral transmittance when such a voltage that makes the contrast highest is applied with the 1/240 duty, 1/13 bias drive. CIE chromaticity co-ordinate under the above conditions is shown in FIG. 48.

The chroma $\Delta C$ was 17.39 and the contrast was 15.

Figure 49:
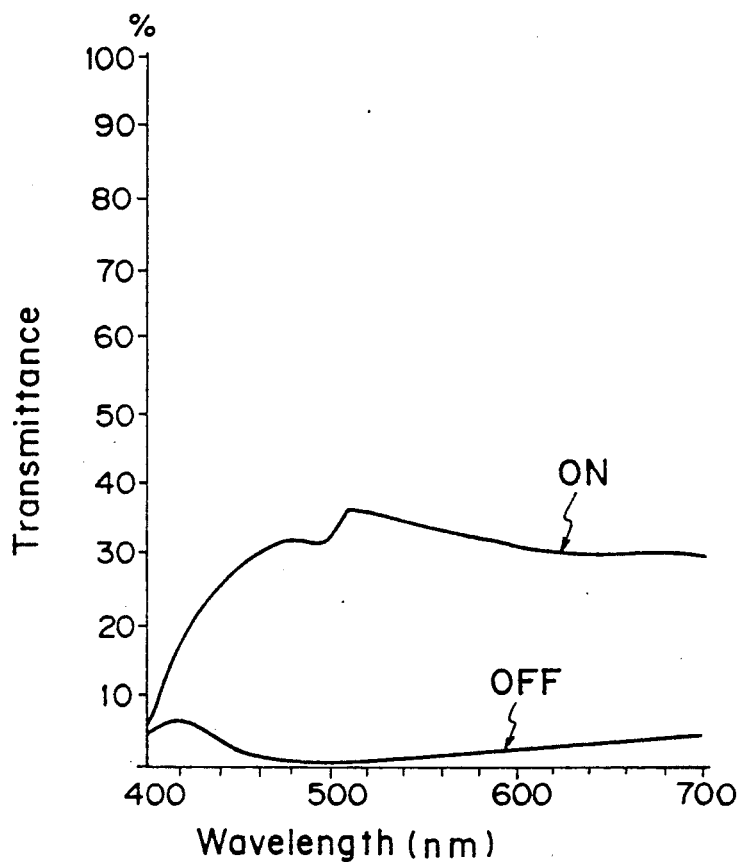
FIG. 49 is a figure showing the spectral transmittance with the on/off voltage applied in comparison embodiment 5-2.

In the comparative example 5-1, as understood from FIG. 49, although the contrast is high, the transmittance falls at the short wavelength side and long wavelength side. The chroma $\Delta C$ is large and as shown in FIG. 48, the white under the application of the on voltage is the colored white, so that it can be understood that the whiteness level is low.

COMPARATIVE EXAMPLE 5-2

As the first phase difference plate 53 and the second phase difference plate 55, there were used the phase difference plate made of uniaxial oriented polyvinyl alcohol polymer film having the retardation value 420 nm (nano meters), while as the liquid crystal cell 54, there was used the liquid crystal cell having the retardation value $d\Delta n = 0.92$ μm, twisted angle = 240°. The respective components were disposed with the disposition angles $\theta 1 = 180°$, $\theta 2 = 80°$, $\alpha = 30°$ and $\beta = 60°$.

FIG. 49 shows the spectral transmittance when such a voltage that makes the contrast highest is applied with the 1/240 duty, 1/13 bias drive. CIE chromaticity co-ordinate under the above conditions is shown in FIG. 50.

The chroma $\Delta C$ was 14.02 and the contrast was 12.

Figure 50:
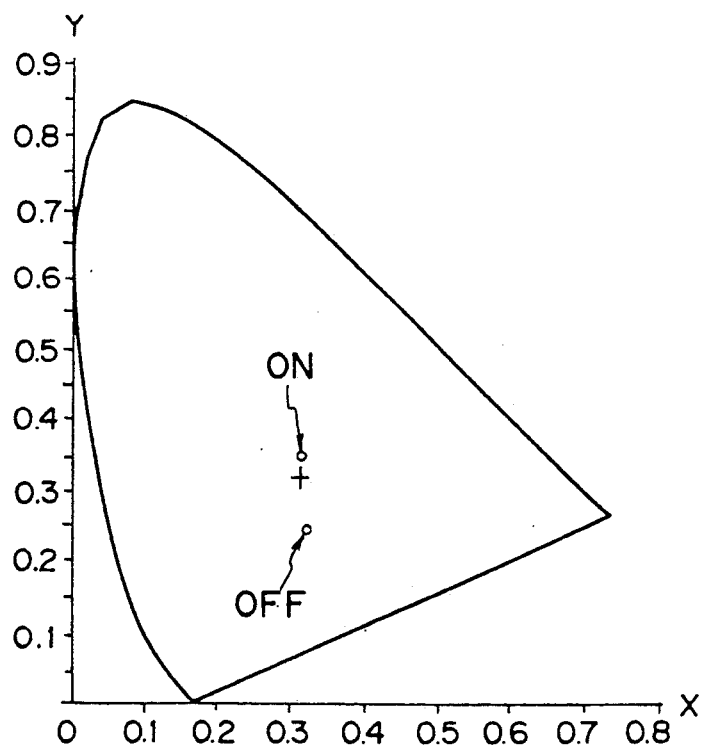
FIG. 50 is a figure showing the positions on the CIE chromaticity coordinates with the on/off voltage applied in comparison embodiment 5-2.

In the comparative example 5-2, since there is used the phase difference plate of which the wave length dispersion of the retardation value is small, the whiteness of at the time of application of the on voltage is better than the whiteness when the phase difference plate of which the wave length dispersion of the retardation values is large (as in the comparative example 5-1) as shown in FIGS. 49 and 50.

The results of the examples 5-a to 5-f and comparative examples 5-1 and 5-2 are shown in the Table 3.

Figure 52:
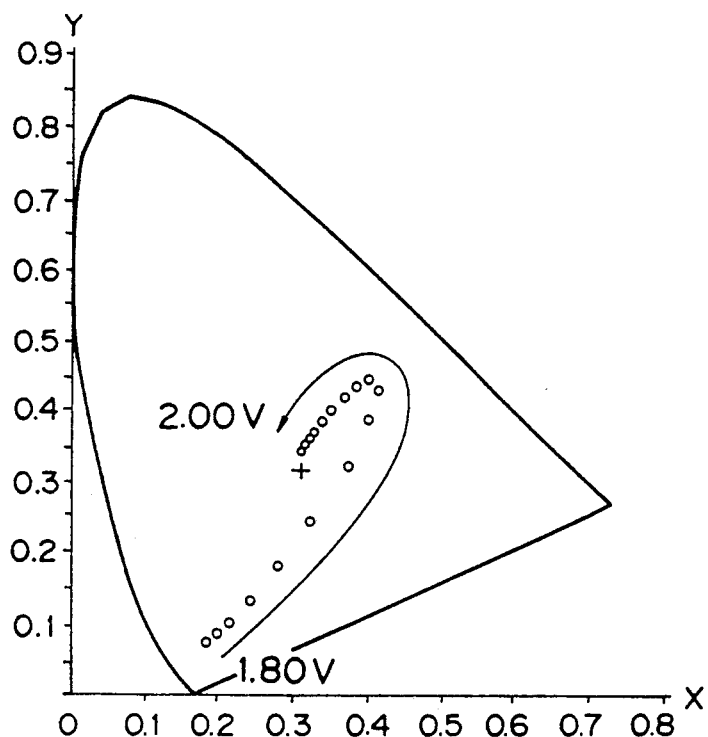
FIG. 52 is a figure showing the color variation due to voltage in comparison embodiment 5-2.
Figure 53:
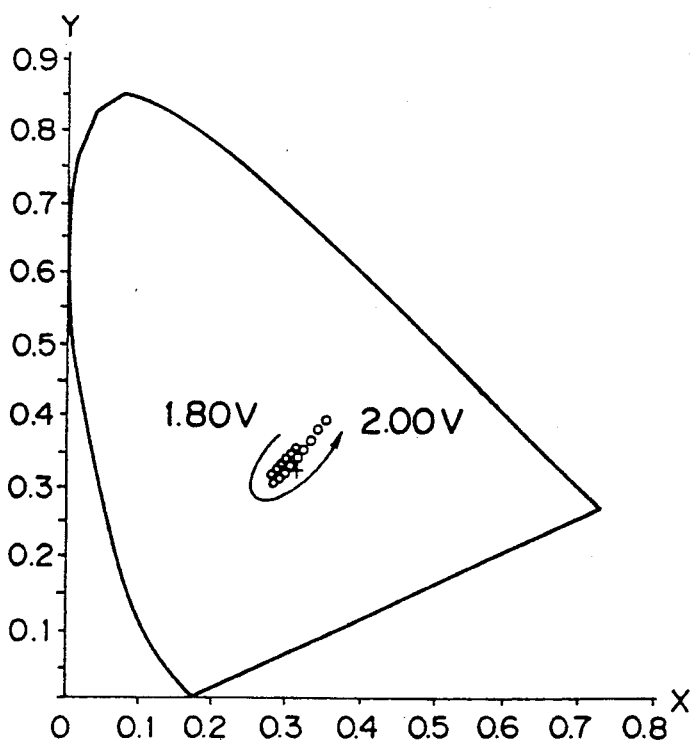
FIG. 53 is a figure showing the color variation due to voltage in embodiment 5-d.

FIG. 52 shows the color change in the case where the phase difference plate of uniaxial oriented polyvinyl alcohol polymer film is used, FIG. 53 shows the color change in the case where the phase difference plate of uniaxial oriented polycarbonate polymer film is used.

As apparent from FIGS. 52 and 53, it can be seen that the color tone change in response to the application voltage change when there is used the phase difference plate made of uniaxial oriented polycarbonate polymer film is smaller than the color tone change in response to the application voltage change when there is used the phase difference plate made of uniaxial oriented polyvinyl alcohol polymer film.

Figure 51:
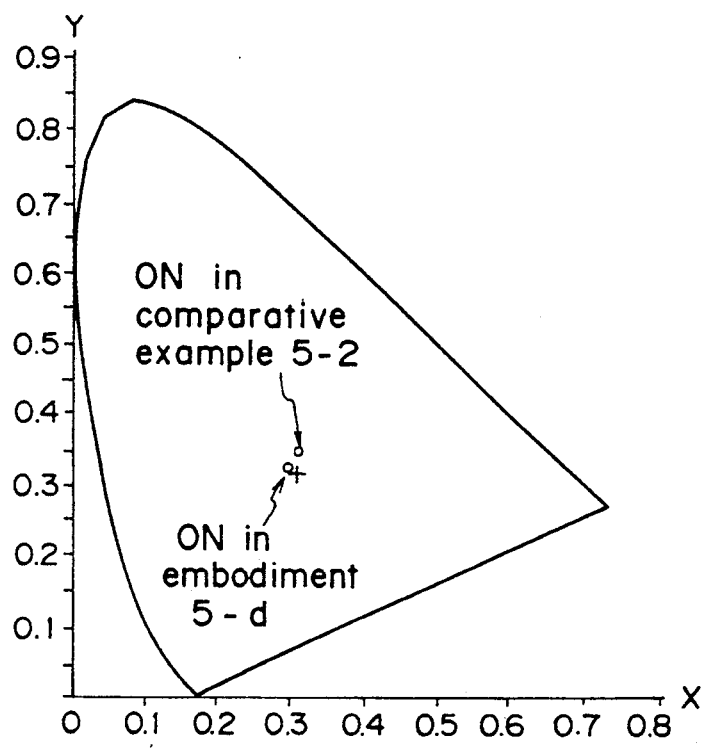
FIG. 51 is a figure showing the positions on the CIE chromaticity coordinates with the on-voltage applied in embodiment 5-d and comparison embodiment 5-2 for comparison.

Accordingly, it can be understood from FIGS. 51 to 53 that the supertwisted liquid crystal display devices according to the above embodiments are suitable to the degradation display because the devices have excellent whiteness level and the color change due to the application voltage change is small.

According to the present invention, since the retardation change for the viewing angle (elevation angle) of the phase difference plate can be decreased, it is possible to provide a liquid crystal display device of high quality display with a decreased dependency of the viewing angle, utilizing the thin and light properties as well as the good contrast property of the liquid crystal display device.

TABLE 3

| | | Em. 5-a | Em. 5-b | Em. 5-c | Em. 5-d | Em. 5-e | Em. 5-f | Comp. 5-1 | Comp. 5-2 |
|---|---|---|---|---|---|---|---|---|---|
| Kind of phase difference plate | | Poly-carbonate | Poly-carbonate | Poly-carbonate | Poly-carbonate | Poly-carbonate | Poly-carbonate | Poly-carbonate | Polyvinyl alcohol |
| Retardation of 1st phase difference plate | | 420 nm | 420 nm | 420 nm | 420 nm | 420 nm | 400 nm | 420 nm | 420 nm |
| Retardation of 2nd phase difference plate | | 420 nm | 420 nm | 420 nm | 420 nm | 420 nm | 440 nm | 420 nm | 420 nm |
| $\theta 1$ | | 65° | 70° | 70° | 75° | 75° | 75° | 80° | 80° |
| $\theta 2$ | | 65° | 65° | 70° | 70° | 70° | 70° | 80° | 80° |
| $\alpha$ | | 30° | 30° | 30° | 35° | 30° | 35° | 30° | 30° |
| $\beta$ | | 60° | 60° | 60° | 60° | 60° | 60° | 60° | 60° |
| OFF | $\Delta u$ | 16.15 | 13.40 | 7.50 | −3.93 | 1.31 | −6.34 | −5.21 | 8.23 |
| | $\Delta v$ | 12.00 | 15.35 | 11.47 | 2.92 | 12.01 | 1.53 | 0.85 | −8.27 |
| | $\Delta C$ | 20.11 | 20.37 | 13.71 | 4.89 | 12.08 | 6.52 | 5.28 | 11.67 |
| ON | $\Delta u$ | 4.78 | 2.55 | −2.85 | −5.19 | −6.94 | −5.39 | −12.81 | −6.35 |
| | $\Delta v$ | −0.24 | 4.35 | −0.29 | 2.34 | 1.80 | 7.41 | 11.76 | 12.50 |
| | $\Delta C$ | 4.79 | 5.04 | 2.86 | 5.69 | 7.17 | 9.16 | 17.39 | 14.02 |
| Contrast | | 10 | 11 | 12 | 13 | 11 | 13 | 15 | 12 |

NOTE:
Em.: Embodiment
Comp.: Comparative Example

Accordingly, there can be obtained a clear display with small chroma $\Delta C$ that is, good whiteness level assuring high contrast in the liquid crystal display device by satisfying the disposition conditions shown in the various examples mentioned above.

FIG. 51 shows the result of comparison of the CIE chromaticity co-ordinate under application of the on voltage in the example 5-d and the comparative example 5-2.

As understood from FIG. 51, the whiteness level is excellent when the phase difference plate made of uniaxial oriented polymer film having a large wavelength dispersion is used, as in the above embodiments, compared to the case when the phase difference plate made of uniaxial oriented polyvinyl alcohol polymer film having a small wavelength dispersion is used.

There are shown in FIGS. 52 and 53 the color variation corresponding to the change of the application voltage by 0.01 V between 1.80 V and 2.00 V.

It is possible to provide the liquid crystal display device having a high speed response and wide viewing angle in addition to high contrast by the combination with the high speed response liquid crystal display cell. Therefore the display device according to the present invention can be employed in personal computers having the mouse system.

The liquid crystal display device according to the present invention can be employed in large size display device of 1024×768 dots and 1120×800 dots.

In one feature of the present invention, a laminate structure of two phase different plates and another laminate structure consisting of a viewing angle compensation plate and a phase difference plate are placed on the front side and rear side of a STN liquid crystal display panel, whereby it is possible to eliminate the drawbacks of the visual color change and the reverse of white and black by the change of viewing angle. This results in expanding available viewing angle of the liquid crystal display device.

In the liquid crystal display device mentioned above, since black and white display is stable, the color change in the color display due to viewing angle can be made small and the display color quality can be improved.

Moreover, in the present invention, the disposition angles of the phase difference plates are selected and it is possible to improve the whiteness level in the display, whereby a clear and bright display without undesired color can be obtained. In addition, since the color tone is scarcely affected by the application voltage, a good degradation display can be made.

What is claimed is:

1. A supertwisted liquid crystal display device comprising:
   a liquid crystal display cell having at least one substrate adjacent thereto; and
   a plurality of phase difference plates functioning as an optical compensation plate, each phase difference plate being made of a uniaxial oriented polymer film, the plurality of phase difference plates being placed adjacent to said liquid crystal display cell, said plurality of phase difference plates including n laminated plates (n being an integer of at least 2) numbered from the first, closest to the substrate, to nth, and oriented such that the retardation values of the phase difference plates are added, a first cross angle between the slow axis of the first phase difference plate and the slow axis of the nth phase difference plate being within a range of 20°-40° (inclusive) and, wherein at least one phase difference plate exists between the first and nth phase difference plates, the slow axis of the at least one phase difference plate existing between the first and nth phase difference plates being within the first cross angle, and a cross angle between the slow axis of the first phase difference plate and the rubbing axis of the at least one substrate is within a range from 70° to 90°, to achieve color compensation.

2. The supertwisted liquid crystal display device according to claim 1, wherein at least one of the phase difference plates is placed on each of a first side and a second side, opposite the first side, of the display device, such that an equal number of the phase difference plates are placed symmetrically, with respect to said liquid crystal cell.

3. A supertwisted liquid crystal display device comprising:
   a liquid crystal display cell having at least one substrate adjacent thereto; and
   a plurality of phase difference plates placed on at least one side of the display device functioning as an optical compensation plate, each phase difference plate being made of a uniaxial oriented polymer film, the plurality of phase difference plates being placed adjacent to said liquid crystal display cell, said plurality of phase difference plates including first and second laminated plates oriented such that the retardation values of the first and second phase difference plates are added, a first cross angle between the slow axes of the two phase difference plates being within a range of 20°-40° (inclusive), wherein the slow axis of the second phase difference plate is parallel to a direction in which elevation angle dependency of the retardation value of the first phase difference plate is minimum, and wherein a cross angle between the slow axis of the first phase difference plate and the rubbing axis of the substrate is within a range from 70° to 90°, to achieve color compensation.

4. The supertwisted liquid crystal display device according to claim 3, wherein first and second phase difference plates are placed on each of a first side and a second side, opposite the first side, of the liquid crystal display cell.

5. The supertwisted liquid crystal display device according to claim 3, wherein the first and second laminated phase difference plates are placed on a first side of the liquid crystal display cell and a single phase difference plate is placed on a second side, opposite the first side, of the liquid crystal display cell.

6. The supertwisted liquid crystal display device according to claim 3, wherein the liquid crystal display cell is a high speed response display cell in which a sum of a rising time and a falling time is 100 milliseconds.

7. A supertwisted liquid crystal display device comprising:
   a liquid crystal display cell having at least one substrate adjacent thereto; and
   a plurality of phase difference plates placed on each of a first side and a second side, opposite the first side, of the liquid crystal display cell, each plurality of phase difference plates functioning as an optical compensation plate, each phase difference plate being made of a uniaxial oriented polymer film, wherein one of said optical compensation plates includes at least two laminated phase difference plates, with a first cross angle between the slow axes of the two laminated phase difference plates being within a range of 20° to 40°, inclusive, and the other optical compensation plate includes a lamination of a phase difference plate and a polymer film being aligned such that its maximum refractive index is oriented in a direction of its film thickness.

8. The supertwisted liquid crystal display device according to claim 7, wherein the first cross angle between the slow axes of the two phase difference plates is within a range between 30° to 40°, inclusive, and a second cross angle between the slow axis of the one of the two laminated phase difference plates that is adjacent to the liquid crystal display cell and the rubbing axis of the at least one substrate is within a range of 70° to 90°, and lamination of the phase difference plate and the polymer film is constituted such that the phase difference plate is adjacent to the liquid crystal cell, an angle between the slow axis of the phase difference plate and an extending direction of the polymer film is 45°, and a cross angle between the slow axis of the phase difference plate and the rubbing axis of the substrate adjacent to the liquid crystal display cell is within a range of 70° to 90°.

9. A supertwisted liquid crystal display device comprising:
   a liquid crystal display cell having at least one substrate adjacent thereto; and
   a plurality of phase difference plates placed on at least one side of the display device, the plurality of phase difference plates on at least one side functioning as an optical compensation plate, each phase difference plate being made of a uniaxial oriented polymer film, the plurality of phase difference places being placed adjacent to said liquid crystal display cell, said plurality of phase difference plates including a laminated first and second plate, oriented such that the retardation values of the first and second phase difference plates are added, a first cross angle between the slow axes of the first and second phase difference plates being within a range of 20°-40° (inclusive), wherein the slow axis of the second phase difference plate is parallel to a direction in which elevation angle dependency of the retardation value of the first phase difference plate is minimum, wherein a cross angle between the slow axis of the first phase difference plate and the rubbing axis of the substrate is within a range of 70° to 90°, and wherein each of said plurality of phase difference plates is made of a polycarbonate uniaxial oriented polymer film.

10. The supertwisted liquid crystal display device according to claim 9, wherein at least one of the plurality of phase difference plates is placed on each of a first side and a second side, opposite the first side, of the liquid crystal cell.

11. The supertwisted liquid crystal display device according to claim 10, wherein the plurality of laminated phase difference plates are placed on a first side of the liquid crystal display cell, and a single layer phase difference plate, of which a cross angle between the slow axis of the phase difference plate proximate to the liquid crystal cell and the rubbing axis of a substrate adjacent to the liquid crystal display cell is within a range of 70° to 90°, is placed on a second side of the liquid crystal display cell, opposite the first side, the single layer phase difference plate being made of a polycarbonate uniaxial oriented polymer film.

12. A liquid crystal display device comprising:
a first polarizing plate;
a first phase difference plate;
a supertwist type liquid crystal display cell;
a second phase difference plate; and
a second polarizing plate, arranged in the previously described order, each of the first and second phase difference plates being made of a uniaxial oriented polymer film having a large wavelength dispersion of retardation, wherein a first cross angle between the slow axis of the first phase difference plate and a first rubbing direction of the liquid crystal display cell adjacent to the first phase difference plate, and a second cross angle between the slow axis of the second phase difference plate and a second rubbing direction of the liquid crystal display cell adjacent to the second phase difference plate, are each within a range of 62° to 77°, a third cross angle between the absorbing axis of the first polarizing plate and the slow axis of the first phase difference plate is within a range of 29° to 38°, and a fourth cross angle between the absorbing axis of the second polarizing plate and the slow axis of the second phase difference plate is within a range of 55° to 62°.

* * * * *